(12) United States Patent
Hiroi et al.

(10) Patent No.: US 7,283,671 B2
(45) Date of Patent: Oct. 16, 2007

(54) COMMUNICATIONS TERMINAL

(75) Inventors: Kazushige Hiroi, Machida (JP); Tsutomu Hara, Yokohama (JP); Seishi Hanaoka, Kodaira (JP); Masaya Umemura, Yokosuka (JP); Kazuo Shigematsu, Yoshikawa (JP)

(73) Assignee: Hitachi, Ltd., Tokyo (JP)

( * ) Notice: Subject to any disclaimer, the term of this patent is extended or adjusted under 35 U.S.C. 154(b) by 659 days.

(21) Appl. No.: 10/654,610

(22) Filed: Sep. 4, 2003

(65) Prior Publication Data

US 2004/0233180 A1 Nov. 25, 2004

(30) Foreign Application Priority Data

May 20, 2003 (JP) ............................. 2003-141285

(51) Int. Cl.
*G06K 9/00* (2006.01)
*G09G 5/00* (2006.01)

(52) U.S. Cl. ...................... 382/187; 345/2.2

(58) Field of Classification Search ............... 382/181, 382/186–189, 313; 345/2.1, 2.2
See application file for complete search history.

(56) References Cited

U.S. PATENT DOCUMENTS

| | | | |
|---|---|---|---|
| 5,176,520 A * | 1/1993 | Hamilton ................. | 434/350 |
| 5,745,688 A * | 4/1998 | Oka ........................... | 709/204 |
| 6,806,847 B2 * | 10/2004 | Nixon et al. ................. | 345/2.1 |
| 6,839,061 B1 * | 1/2005 | Kamakura et al. .......... | 345/520 |
| 6,879,997 B1 * | 4/2005 | Ketola et al. ............... | 709/208 |

FOREIGN PATENT DOCUMENTS

| | | |
|---|---|---|
| JP | 5-63874 | 3/1993 |
| JP | 6-284241 | 10/1994 |
| JP | P2002-330244 A | 11/2002 |

* cited by examiner

*Primary Examiner*—Daniel Mariam
(74) *Attorney, Agent, or Firm*—McDermott Will & Emery LLP

(57) ABSTRACT

A terminal acquires and manages a shared candidate image to be a candidate for the next image shared with the other terminal, transmits or receives the image, and transmits or receives an image generated by superimposing handwritten data to be shared on a shared image. It switches an image display between the shared candidate image and an image to be displayed in such a way as to be triggered by a reception of a new shared image.

20 Claims, 30 Drawing Sheets

FIG.22
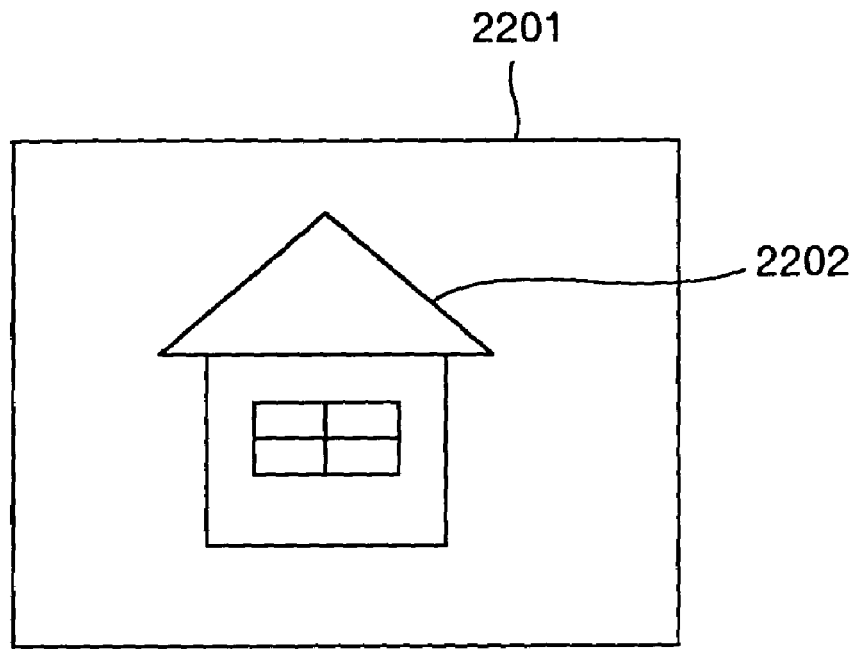
AFTER ELAPSE OF CERTAIN PERIOD OF TIME
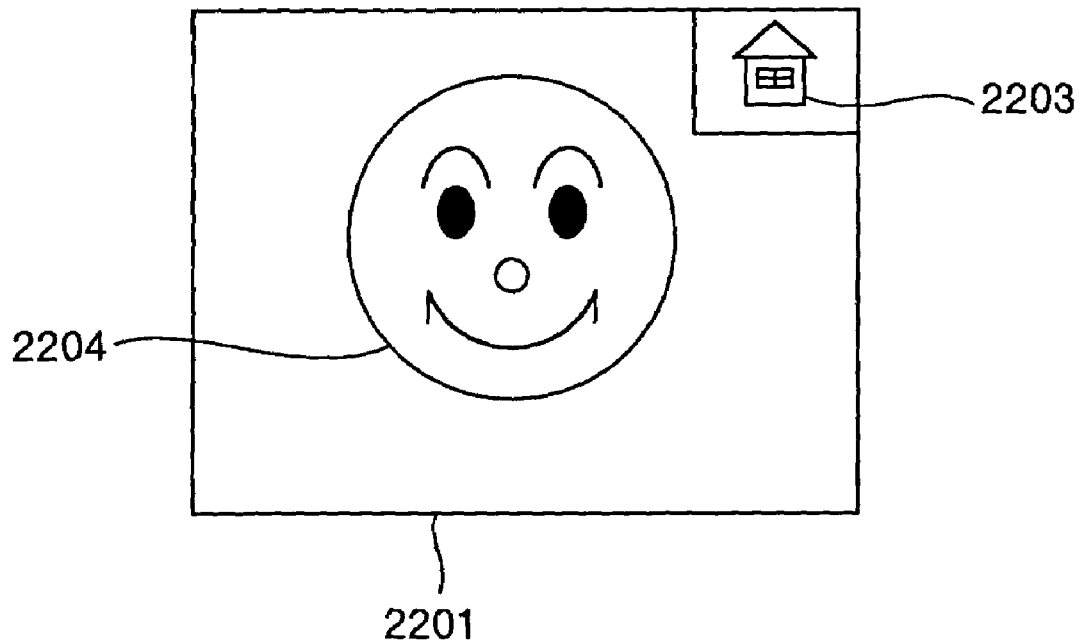

COMMUNICATIONS TERMINAL

BACKGROUND OF THE INVENTION

1. Field of the Invention

The present invention relates to a portable terminal communicating with the other terminal by sharing images and handwritten data.

2. Description of the Related Art

By way of examples of a communications system capable of exchanging image data such as a still image and handwritten data, there have been disclosed "the telewriting device" in JP-A-6-284241 (Literature 1) and the video conference system and the multifunctional facsimile described regarding "the audio visual communication apparatus" in JP-A-2002-330244 (Literature 2).

The telewriting device is capable of writing a graphic or a text by means of a pointing device on a screen of a terminal fixed to a network such as a telephone line or an Ethernet™ and delivering the image written into the individual terminal between terminals to display the same image on the terminals.

The multifunctional facsimile is capable of storing a handwritten message acquired by a scanner or a message scribbled on a liquid crystal device once and calling a facsimile on the other end to transfer the stored image.

Furthermore, "the handwriting communications terminal" disclosed in JP-A-5-063874 is capable of exchanging shared image data such as a text in the field of education or materials for a meeting and displaying the image data between terminals during the meeting.

SUMMARY OF THE INVENTION

As set forth hereinabove, communications in images and handwritten data can be achieved by the conventional technologies. For example, the technology in Literature 1, however, lacks in consideration in a display screen size of the terminal. The technology in Literature 2 relates to a facsimile and therefore it is incapable of exchanging handwritten data nor image data in real time, more specifically, incapable of adding handwritten data to a transferred image nor adding characters and graphics for more detailed information.

In the technology in Literature 3, shared image data is previously acquired, but its content sometimes varies depending upon the acquisition timing. Furthermore, the data is not intended for exchanging in real time and therefore it is incapable of correcting and changing the data.

It is an object of the present invention to provide a user-friendly communications terminal having a small display screen such as, for example, a portable terminal capable of sharing an image with the other terminal, exchanging handwritten data with the other terminal, and displaying the exchanged handwritten data on the shared image in real time. Particularly if one terminal has an image shared with the other terminal and is to display a candidate for the next shared image such as an image taken by a camera during communication, displaying the candidate shared image on the current shared image makes the current shared image invisible, thereby causing an inconsistency in the displayed image between the terminal and the other terminal. In another case, the current shared image is erased and the terminal cannot return to the original shared image even after canceling the display or transmission of the shared candidate image, thereby causing a trouble in communication.

It is an object of the present invention to display an image of a candidate for the next shared image without affecting the shared image and handwritten data.

To solve the above problems and to achieve the object of the invention, the present invention has been provided. According to the present invention, there is provided a communications terminal, comprising: an image acquisition unit for acquiring image data; a data transmitter-receiver unit for transmitting and receiving data to and from the other terminal; a display unit for displaying an image; a handwriting input unit for a user to input handwritten data; an image acquisition control unit for acquiring and managing data of a shared candidate image as a candidate for an image to be shared with the other terminal by means of the image acquisition unit; an image transmission control unit for transmitting data of the shared image shared with the other terminal and managing the shared image by means of the data transmitter-receiver unit; an image reception control unit for receiving the data of the shared image from the other terminal and managing the shared image by means of the data transmitter-receiver unit; an image transmission instructing unit for instructing the image transmission control unit to transmit the data of the shared image to the other terminal; a display control unit for controlling a display of the shared image and a display of the shared candidate image to the display unit; a display image switching instructing unit for instructing the display control unit on switching between the display of the shared image and the display of the shared candidate image; a handwritten data transmission control unit for controlling the transmission of the handwritten data input by the handwriting input unit and superimposing the transmitted handwritten data on the shared image; and a handwritten data reception control unit for controlling a reception of the handwritten data transmitted from the other terminal and superimposing the received handwritten data on the shared image, wherein the display control unit causes switching between the display of the shared image and the display of the shared candidate image in accordance with an instruction of the display image switching instructing unit. Otherwise, when the image acquisition unit acquires the data of the shared candidate image, the display control unit may display the shared candidate image on the display unit for a certain period of time and then switches the display to the display of the shared image. Otherwise, the display control unit may be triggered by a reception of the handwritten data through the handwritten data reception unit to cause switching to the display of the shared image.

The image transmission control unit may be triggered by an instruction of the image transmission instructing unit to set the data of the shared candidate image as data of a new shared image and to transmit the data of the new shared image to the other terminal, and the image reception control unit may set the received image data as data of the shared image.

Otherwise, the image acquisition control unit may generate a reduced image from the data of the shared candidate image and the display control unit may display the reduced image on the shared image. In this connection, when the image acquisition unit acquires the data of the shared candidate image, the display control unit displays the shared candidate image for a certain period of time and then displays the reduced image on the shared image. Otherwise, the display control unit may cause switching between the display of the shared image, the display of the shared candidate image, and the display of the reduced image on the shared image in accordance with the instruction of the display image switching instructing unit. Otherwise, the display control unit may be triggered by a reception of the handwritten data through the handwritten data reception unit to cause switching among the display of the shared image, the display of the shared candidate image, and the display of the reduced image on the shared image.

Other objects, features and advantages of the invention will become apparent from the following description of the embodiments of the invention taken in conjunction with the accompanying drawings.

BRIEF DESCRIPTION OF THE DRAWINGS

FIG. 22 is a diagram for explaining processing of displaying a shared candidate image not reduced for a certain period of time before superimposing and displaying a reduced image of the shared candidate image on a shared image in the communications terminal according to the second embodiment;

DETAILED DESCRIPTION OF THE EMBODIMENTS

The present invention relates to a terminal having a small display screen such as, for example, a portable terminal for sharing images and exchanging handwritten data with the other terminal and for displaying the exchanged handwritten data on the shared image in real time, and particularly to a terminal capable of displaying and selecting a shared candidate image without any trouble in communication with the other terminal.

Figure 1:
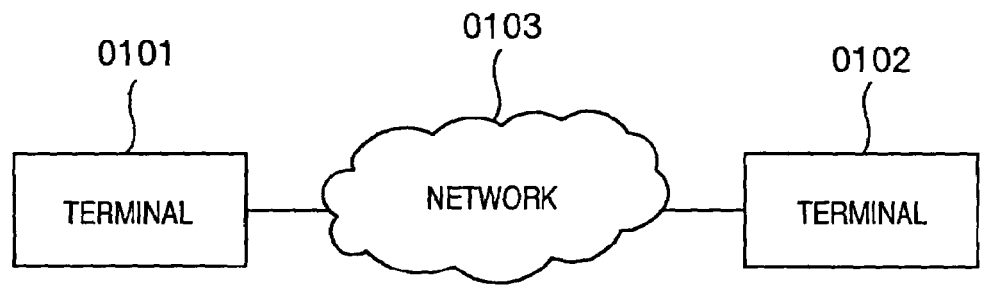
FIG. 1 is an example of a communications system structure.

A first embodiment according to the present invention will now be described in detail hereinafter with reference to the accompanying drawings. Referring to FIG. 1, there is shown an example of a communications system structure using the terminal according to the embodiment of the present invention.

As shown in FIG. 1, the communications system using the terminal according to this embodiment comprises at least two terminals 0101 and 0102 and a network 0103; these terminals are capable of communicating with each other through the network 0103.

The network 0103 comprises an IP network typified by an Internet or a telephone network, ISDN, a PHS network, a cellular telephony network, or a network using a wireless LAN or the like.

The terminal 0101 and the terminal 0102 enable a user of the system to transmit and receive voice data, images, and handwritten data. They can be compact portable terminals such as, for example, a mobile telephone and a PDA or personal computer systems.

Figure 2:
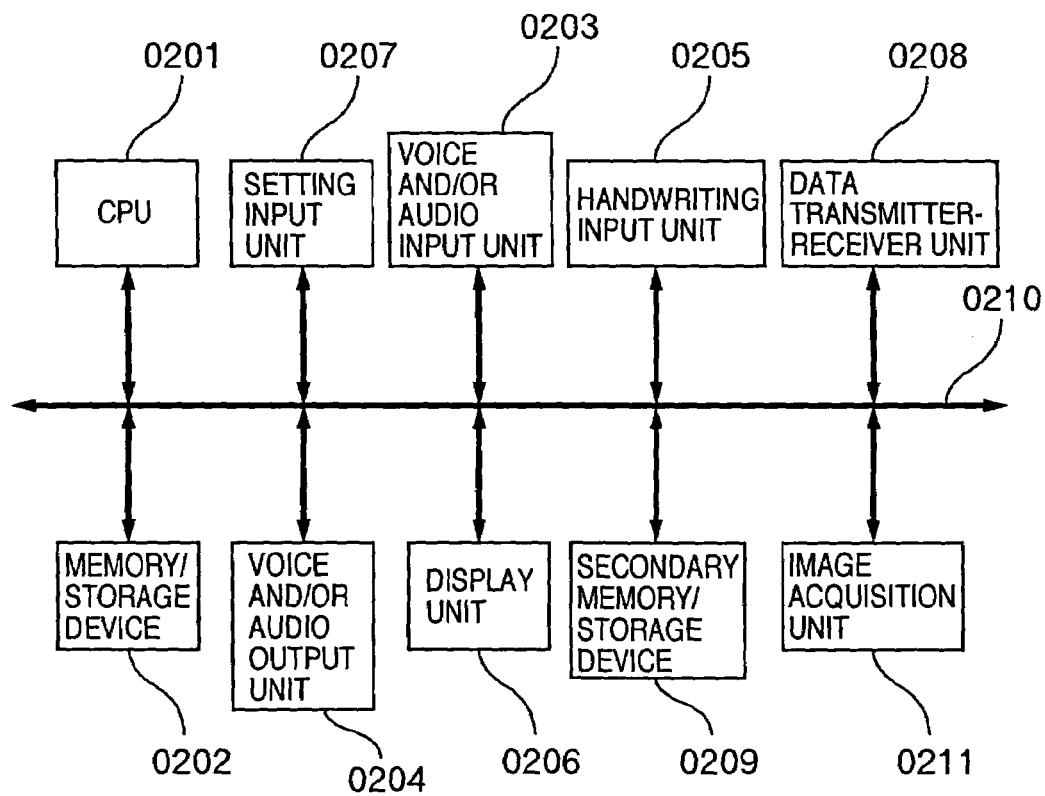
FIG. 2 is a block diagram showing an example of a hardware configuration of the communications terminal.

The following describes a configuration of the terminal by using FIG. 2. Referring to FIG. 2, there is shown a block diagram illustrating an example of a hardware configuration of the terminal. As shown in FIG. 2, the terminal comprises a central processing unit 0201, a memory/storage device 0202 and a secondary memory/storage device 0209, a voice input unit 0203, a voice output unit 0204, a handwriting input unit 0205, a display unit 0206, a setting input unit 0207, a data transmitter-receiver unit 0208, and an image acquisition unit 0211. They can exchange data with each other through a bus 0210.

The setting input unit 0207 comprises a pointing device such as an operation button, a mouse, or a pen input device. It is for use in inputting operation setting information in the terminal or a destination such as a phone number or an IP address of the other terminal in communication.

The data transmitter-receiver unit 0208 comprises, for example, a wireless LAN card in a wireless LAN, a network card, or a module for a connection to a network of a PHS or a mobile telephone. The terminal 0101 and the terminal 0102 get ready to be connected to the network 0103 through the data transmitter-receiver unit 0208. Thereby, the terminal 0101 and the terminal 0102 can begin and end a session through the network 0103 for transmitting and receiving data.

The voice input unit 0203 comprises a microphone or the like, which digitizes external voice and sounds and input them to the terminal.

The handwriting input unit 0205 comprises a pointing device such as a mouse or a pen input device or a liquid crystal touch panel and acquires handwritten data (coordinates of points, etc.) input by the user.

The central processing unit 0201 can be, for example, a general-purpose processor. It controls an operation of the terminal on the basis of a program defining operations of the terminal.

The voice output unit 0204 comprises a speaker or the like. It converts digital voice data in the terminal to analog data and outputs it to the outside.

The display unit 0206 comprises a liquid crystal panel or the like and displays a menu or guidance for a user to input information using the setting input device 0207 or displays information input by the user. In addition, the display unit 0206 displays handwritten data such as a dot or a line input by the handwriting input unit 0205 or handwritten data transmitted or received to or from the other terminal in communication through the data transmitter-receiver unit 0208. Furthermore, the display unit 0206 displays an image acquired by the image acquisition unit 0211 and an image transmitted or received to or from the other terminal in communication through the data transmitter-receiver unit 0208.

The memory/storage device 0202 comprises a RAM, a ROM, a flash memory, or a hard disk. It stores a program executed by the central processing unit 0201, voice data input by the voice input unit 0203, handwritten data input by the handwriting input unit 0205, data transmitted or received to or from the data transmitter-receiver unit 0208, voice data to be output by the voice output unit 0204, handwritten data or image data to be displayed by the display unit 0206, image data acquired by the image acquisition unit 0211, or other data processed by the central processing unit 0201.

The secondary memory/storage device 0209 comprises a RAM, a ROM, a flash memory, or a hard disk. It stores destination data such as, for example, a telephone number or an IP address of the other terminal in communication, handwritten data or image data to be transmitted or having been received, or other data that the user does not want to lose after the terminal is turned off.

The image acquisition unit 0211 comprises, for example, a camera. It acquires data of a shared candidate image to be a candidate for an image shared with the other terminal in communication. The image acquisition unit 0211 can be, for example, a file system or the like instead of a camera, acquiring image data from an image file stored in the secondary memory/storage device 0209 or the memory/storage device 0202.

Figure 3:
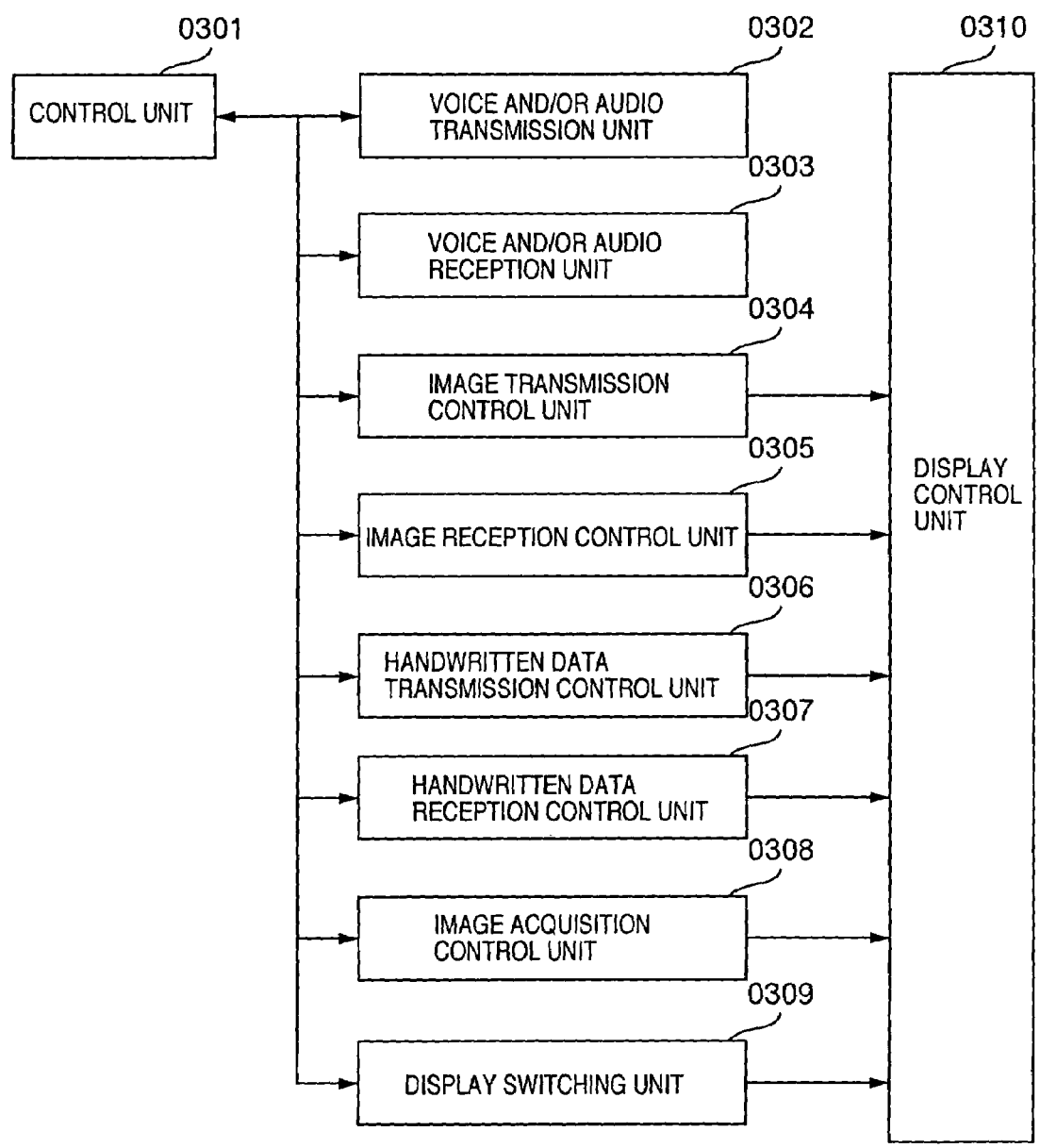
FIG. 3 is a diagram of an example of a structure of software executed by a central processing unit of the communications terminal.

The following describes a structure of the program executed by the central processing unit 0201 of the terminal. Referring to FIG. 3, there is shown a diagram illustrating an example of the structure of the program executed by the central processing unit 0201 of the terminal.

As shown in FIG. 3, the program executed by the central processing unit 0201 comprises a control unit 0301, a voice transmission unit 0302, a voice reception unit 0303, an image transmission control unit 0304, an image reception control unit 0305, a handwritten data transmission control unit 0306, a handwritten data reception control unit 0307, an image acquisition control unit 0308, a display switching unit 0309, and a display control unit 0310.

The control unit 0301 starts and ends other components in accordance with information input by the user through the setting input unit 0207. In addition, it controls a session in such a way as to enable transmissions and receptions of voice data, image data, and handwritten data to or from the other terminal in communication through the data transmitter-receiver unit 0208.

The voice transmission unit 0302 encodes and packetizes voice data input through the voice input unit 0203 and transmits it to the other terminal in communication through the data transmitter-receiver unit 0208.

The voice reception unit 0303 acquires the encoded voice data from a packet of the voice data received through the data transmitter-receiver unit 0208, decodes it, and then outputs the voice through the voice output unit 0204.

The image transmission control unit 0304 controls the transmission when transmitting image data to the other terminal in communication through the data transmitter-receiver unit 0208. If image data is transmitted to the other terminal in communication, the image transmission control unit 0304 sets the image as a new shared image to be shared with the other terminal.

The image reception control unit 0305 controls a reception when receiving the image data from the other terminal in communication through the data transmitter-receiver unit 0208. If image data is received from the other terminal in communication, the image reception control unit 0305 sets the image as a new shared image to be shared with the other terminal.

The handwritten data transmission control unit 0306 controls the transmission when transmitting handwritten data input by the user by means of the handwriting input unit 0205 through the data transmitter-receiver unit 0208 to the other terminal in communication. In addition, the handwritten data transmission control unit 0306 generates data of a shared image made of the transmitted handwritten data superimposed on shared image data.

The handwritten data reception control unit 0307 controls the reception when receiving the handwritten data from the other terminal in communication through the data transmitter-receiver unit 0208. In addition, the handwritten data reception control unit 0307 generates data of a shared image made of the received handwritten data superimposed on shared image data.

The image acquisition control unit 0308 controls an operation of acquiring data of a shared candidate image to be a candidate for an image shared with the other terminal in communication acquired by the image acquisition unit 0211.

The display switching unit 0309 instructs the display control unit 0310 to change an image to be displayed in an image and handwritten data display area 0404 on the display unit 0206 described later. The display control unit 0310 controls the image to be displayed in the image and handwritten data display area 0404 on the display unit 0206.

Figure 4:
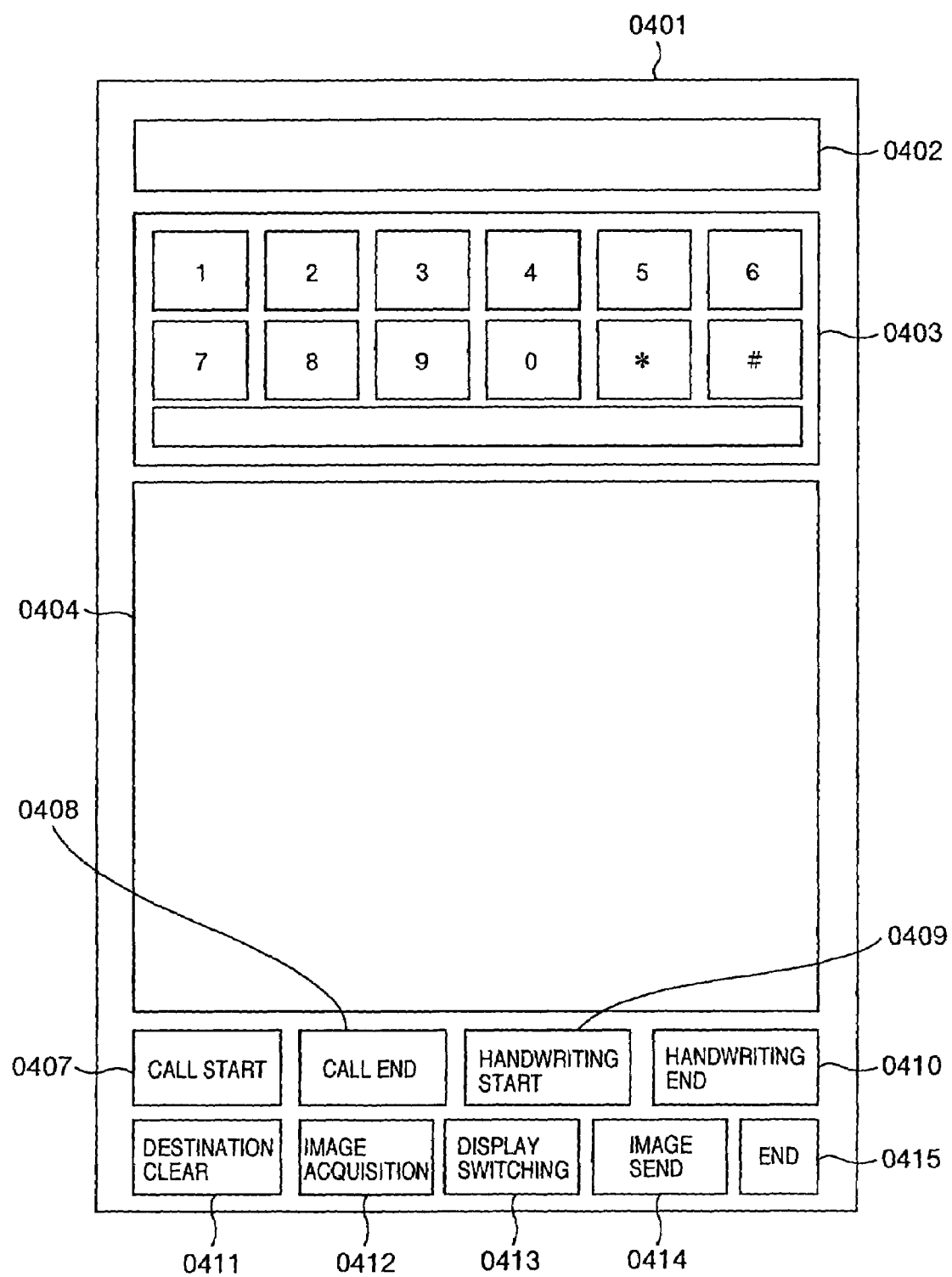
FIG. 4 is a diagram illustrating a man-machine interface of the communications terminal, given as an example of a display screen displayed on the display unit of the terminal.

The following describes a man-machine interface of the communications terminal by using FIG. 4.

FIG. 4 may be a display screen displayed on the display unit 0206 when the communications terminal is started.

As shown in FIG. 4, when the communications terminal is started, a screen 0401 displayed on the display unit 0206 of the terminal comprises a destination display area 0402, destination input buttons 0403, an image and handwritten data display area 0404, a call start button 0407, a call end button 0408, a handwriting start button 0409, a handwriting end button 0410, a destination clear button 0411, an image acquisition button 0412, a display switching button 0413, an image send button 0414, and an end button 0415.

The destination display area 0402 is for use in displaying a destination of the other terminal in communication input by the user by operating the destination input buttons 0403 through the setting input unit 0207. The destination of the other terminal in communication may be, for example, a phone number or an IP address of the other terminal in communication.

The destination input buttons 0403 can be operated by the user through the setting input unit 0207. Thereby, the user can input the destination of the other terminal in communication. The destination input buttons 0403 need not always be numeric buttons, but can be, for example, a name of the other party in communication or other buttons or character recognition pads by which an identification name of the other terminal in communication can be input.

The image and handwritten data display area 0404 is for use in displaying a shared candidate image acquired by the image acquisition unit 0211 or an image shared with the other terminal in communication and handwritten data.

The call start button 0407 enables the user to instruct the terminal to start transmitting and receiving voice to and from the other terminal in communication displayed in the destination display area 0402 by operating the button through the setting input unit 0207.

The call end button 0408 enables the user to instruct the terminal to end transmitting and receiving voice to and from the other terminal in communication by operating the button through the setting input unit 0207.

The handwriting start button 0409 enables the user to instruct the terminal to start transmitting and receiving handwritten data to and from the other terminal in communication displayed in the destination display area 0402 and displaying it by operating the button through the setting input unit 0207.

The handwriting end button 0410 enables the user to instruct the terminal to end transmitting and receiving handwritten data to and from the other terminal in communication and displaying it by operating the button through the setting input unit 0207.

The destination clear button 0411 enables the user to instruct the terminal to clear a destination displayed in the destination display area 0402 by operating the button through the setting input unit 0207.

The image acquisition button 0412 enables the user to instruct the terminal to acquire a shared candidate image to be a candidate for an image shared with the other terminal in communication from the image acquisition unit 0211 by operating the button through the setting input unit 0207.

The display switching button 0413 enables the user to instruct the terminal to switch an image displayed in the image and handwritten data display area 0404 on the display unit 0206 by operating the button through the setting input unit 0207.

The image send button 0414 enables the user to instruct the terminal to send data of the shared candidate image acquired by the image acquisition unit 0211 to the other terminal in communication by operating the button through the setting input unit 0207.

The end button 0415 enables the user to instruct the terminal to end displaying the screen 0401 and to end the operation of the communications terminal by operating the button through the setting input unit 0207.

While it is assumed that the above buttons are displayed on the display unit 0206 of the terminal, the present invention is not so limited, but they can be, for example, hardware buttons on the terminal. Furthermore, while it is assumed that the user instructs the terminal to perform the operations with the above buttons, the present invention is not so limited. For example, without the above buttons, the same operations as with the above various buttons can be achieved by voice inputs. In this case, input voice may be recognized so that the same operations as with the various buttons can be performed on the basis of the recognized voice.

Figure 5:
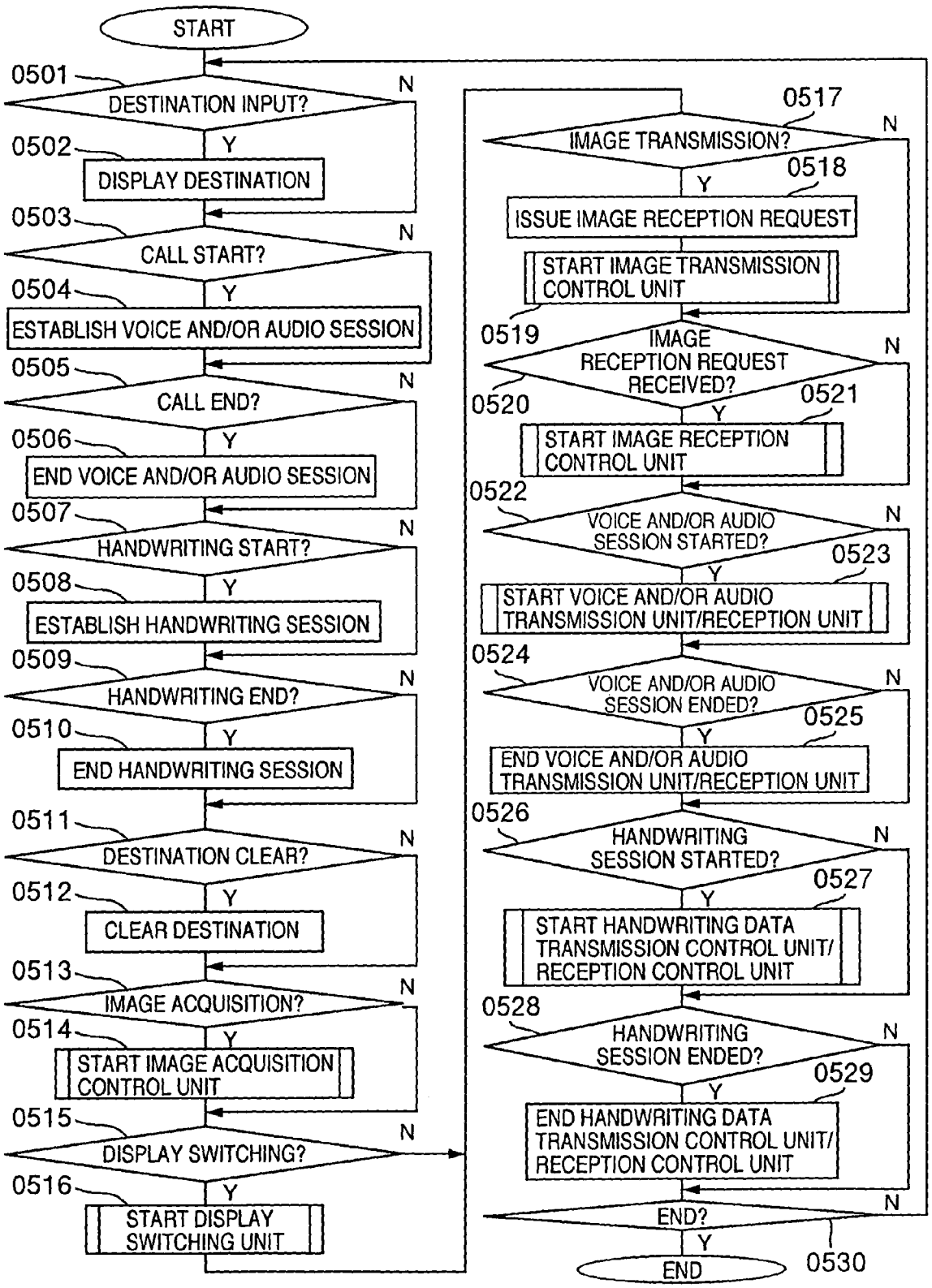
FIG. 5 is an example of a flowchart showing contents of processing of a control unit in the communications terminal.

With reference to FIG. 5, the following describes details of processing of the control unit 0301 executed by the central processing unit 0201 since the operation is started at the start-up of the communications terminal until the user instructs the communications terminal to end the operation through the end button 0415. Referring to FIG. 5, there is shown an example of a flowchart illustrating contents of the processing of the control unit 0301. The operation of the control unit 0301 is recognized as a task separated from other components and therefore it is executed by the central processing unit 0201 in parallel with other components, that is, executed in parallel with other software components, for example.

As shown in FIG. 5, the control unit 0301 determines whether the user pushed the destination input buttons 0403 to input a destination of the other terminal in communication (step 0501). If it determines that the user input the destination, it displays the input destination in the destination display area 0402 (step 0502). On the other hand, unless it determines that the user input the destination in the step 0501, it skips the step 0502.

Subsequently, the control unit 0301 determines whether the user pushed the call start button 0407 to give an instruction of a call start (step 0503). If it determines that the user gave the instruction of the call start, it establishes a voice session with the other terminal in communication (step 0504). On the other hand, unless the control unit 0301 determines that the user gave the instruction of the call start as a result of the determination in the step 0503, it skips the operation in the step 0504 without the establishment of the voice session with the other terminal in communication. Regarding a procedure for establishing the voice session, for example, a method of establishing a voice session regulated by RFC2543 is available.

Subsequently, the control unit 0301 determines whether the user pushed the call end button 0408 to give an instruction of a call end (step 0505). If it determines that the user gave the instruction of the call end, it ends the voice session with the other terminal in communication (step 0506). On the other hand, unless it determines that the user gave the instruction of the call end as a result of the determination in the step 0505, it skips the step 0506, not ending the voice session with the other terminal in communication. Regarding a procedure for ending the voice session, for example, a method of ending a voice session regulated by RFC2543 is available.

Subsequently, the control unit 0301 determines whether the user pushed the handwriting start button 0409 to give an instruction of a start of transmitting/receiving and displaying handwritten data (step 0507). If it determines that the user gave the instruction of the start of transmitting/receiving and displaying handwritten data, it establishes a handwriting session with the other terminal in communication (step 0508). On the other hand, unless the user gave the instruction of the start of transmitting/receiving and displaying handwritten data as a result of the determination in the step 0507, the control unit skips the step 0508, not establishing the handwriting session with the other terminal in communication. Regarding a procedure for establishing the handwriting session, for example, a method of starting a data session regulated by RFC2543 is available.

Subsequently, the control unit 0301 determines whether the user pushed the handwriting end button 0410 to give an instruction of an end of transmitting/receiving and displaying handwritten data (step 0509). If it determines that the user gave the instruction of the end of transmitting/receiving and displaying the handwritten data, it ends a handwriting session with the other terminal in communication (step 0510). On the other hand, unless it determines that the user gave the instruction of the end of transmitting/receiving and displaying handwritten data as a result of the determination in the step 0509, it skips the step 0510, not ending the handwriting session with the other terminal in communication. Regarding a procedure for ending the handwriting session, for example, a method of ending a data session regulated by RFC2543 is available.

Subsequently, the control unit 0301 determines whether the user pushes the destination clear button 0411 to direct clearing a destination (step 0511). If it determines that the user directed clearing the destination, it clears the destination displayed in the destination display area 0402 (step 0512). On the other hand, unless it determines that the user directed clearing the destination, it skips the step 0512, not clearing the destination displayed in the destination display area 0402.

Subsequently, the control unit 0301 determines whether the user pushed the image acquisition button 0412 to give an instruction of acquiring an image (step 0513). If it determines that the user gave the instruction of acquiring the image, it starts the image acquisition control unit 0308 to acquire image data of a candidate for a shared image from the image acquisition unit 0211 (step 0514). Details of processing of the image acquisition control unit 0308 are described later. On the other hand, unless it determines that the user gave the instruction of acquiring the image in the step 0513, it skips the step 0514, not starting the image acquisition control unit 0308 nor acquiring the image data of the candidate for the shared image from the image acquisition unit 0211.

Subsequently, the control unit 0301 determines whether the user pushed the display switching button 0413 to give an instruction of switching an image displayed in the image and handwritten data display area 0404 (step 0515). If it determines that the user gave the instruction of switching the image, it starts the display switching unit 0309 to switch the image displayed in the image and handwritten data display area 0404 (step 0516). Details of processing of the display switching unit 0309 are described later. On the other hand, unless it determines that the user gave the instruction of switching the image in the step 0515, it skips the step 0516, not starting the display switching unit 0309.

Thereafter, the control unit 0301 determines whether the user pushed the image send button 0414 to give an instruction of transmitting a shared candidate image to the other terminal in communication (step 0517). If it determines that the user gave the instruction of the transmission, it issues an image reception request through the data transmitter-receiver unit 0208 to the other terminal in communication (step 0518), starts the image transmission control unit 0304 (step 0519), and transmits the image data of the shared candidate image acquired by the image acquisition unit 0211 to the other terminal in communication. Details of processing of the image transmission control unit 0304 are described later.

On the other hand, unless the control unit 0301 determines that the user gave the instruction of the image transmission, it skips the step 0518 and the step 0519, not issuing the image reception request nor starting the image transmission control unit 0304.

Subsequently, the control unit 0301 determines whether the user received an image reception request through the data transmitter-receiver unit 0208 from the other terminal in communication (step 0520). If it determines that the user received the image reception request, it starts the image reception control unit 0305 (step 0521) to receive image data of a shared candidate image from the other terminal in communication. Details of processing of the image reception control unit 0305 are described later. On the other hand, unless the control unit 0301 determines that the user received the image reception request in the step 0520, it skips the step 0521, not starting the image reception control unit 0305.

Subsequently, the control unit 0301 determines whether a voice session with the other terminal in communication was started (step 0522). If it determines that the voice session was started, it starts the voice transmission unit 0302 and the voice reception unit 0303 (step 0523) to start transmitting and receiving voice data to and from the other terminal in communication. Details of processing of the voice transmission unit 0302 and the voice reception unit 0303 are described later. On the other hand, unless the control unit 0301 determines that the voice session was started in the step 0522, it skips the step 0523, not starting the voice transmission unit 0302 nor the voice reception unit 0303.

Subsequently, the control unit 0301 determines whether a voice session with the other terminal in communication was ended (step 0524). If it determines that the voice session was ended, it halts the voice transmission unit 0302 and the voice reception unit 0303 (step 0525) to end transmitting and receiving voice data to and from the other terminal in communication. On the other hand, unless the control unit 0301 determines that the voice session was ended in the step 0524, it skips the step 0525, not halting the voice transmission unit 0302 nor the voice reception unit 0303.

Thereafter, the control unit 0301 determines whether a handwriting session with the other terminal in communication was started (step 0526). If it determines that the handwriting session was started, it starts the handwritten data transmission control unit 0306 and the handwritten data reception control unit 0307 (step 0527) to start transmitting and receiving the handwritten data to and from the other terminal in communication. Details of processing of the handwritten data transmission control unit 0306 and the handwritten data reception control unit 0307 are described later. On the other hand, unless the control unit 0301 determines that the handwriting session was started in the step 0526, it skips the step 0527, not starting the handwritten data transmission control unit 0306 nor the handwritten data reception control unit 0307.

Subsequently, the control unit 0301 determines whether a handwriting session with the other terminal in communication was ended (step 0528). If it determines that the handwriting session was ended, it halts the handwritten data transmission control unit 0306 and the handwritten data reception control unit 0307 (step 0529) to end transmitting and receiving the handwritten data to and from the other terminal in communication. On the other hand, unless the control unit 0301 determines that the handwriting session was ended in the step 0528, it skips the step 0529, not halting the handwritten data transmission control unit 0306 nor the handwritten data reception control unit 0307.

Subsequently, the control unit 0301 determines whether the user pushed the end button 0415 to give an instruction of ending the operation of the terminal (step 0530). Unless it determines that the user gave the instruction of ending the operation, it returns to the above step 0501 to repeat the steps 0501 to 0530 in the above until the user gives the instruction of ending the operation.

On the other hand, if the control unit 0301 determines that the user gave the instruction of ending the operation of the terminal in the above step 0530, it terminates the processing of the control unit 0301 to end the operation of the terminal.

Figure 6:
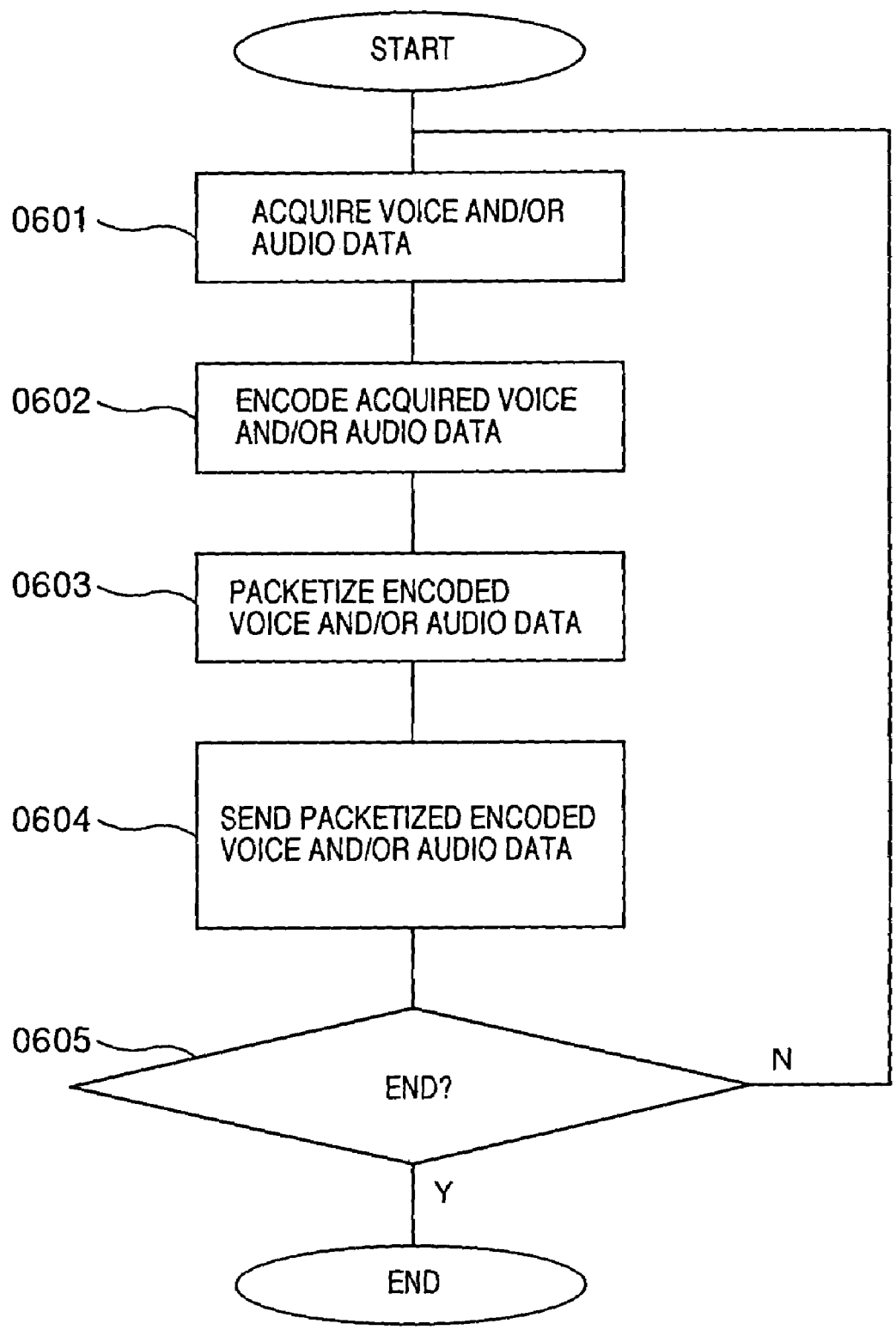
FIG. 6 is an example of a flowchart showing contents of processing of a voice transmission unit in the communications terminal.

The following describes details of processing of the voice transmission unit 0302 executed by the central processing unit 0201 since it is started by the control unit 0301 until it is ended by the control unit 0301 again with reference to FIG. 6. Referring to FIG. 6, there is shown an example of a flowchart illustrating contents of the processing of the voice transmission unit 0302. The operation of the voice transmission unit 0302 is recognized as a task separated from other components and therefore it is executed by the central processing unit 0201 in parallel with other components, that is, executed in parallel with other software components, for example.

As shown in FIG. 6, the voice transmission unit 0302 first acquires voice data from the voice input unit 0203 (step 0601) and encodes the acquired voice data (step 0602). Regarding the encoding method, for example, G.711 or the like method recommended by the ITU-T is available.

Subsequently, the voice transmission unit 0302 packetizes the encoded voice data (step 0603) and transmits the packetized encoded voice data through the data transmitter-receiver unit 0208 to the other terminal in communication where a voice session has already been started (step 0604). Regarding the packetizing method, for example, a method regulated by RFC2543 is available.

Subsequently, the voice transmission unit 0302 determines whether the control unit 0301 gave an instruction of terminating the voice transmission unit 0302 (step 0605). Unless it determines that the control unit 0301 gave the instruction of terminating the voice transmission unit 0302, it returns to the step 0601 to repeat the steps 0601 to 0605 in the above until the control unit 0301 gives the instruction of terminating the voice transmission unit 0302. On the other hand, if the voice transmission unit 0302 determines that the control unit 0301 gave the instruction of terminating the voice transmission unit 0302 in the above step 0605, it terminates the processing in the voice transmission unit 0302.

Figure 7:
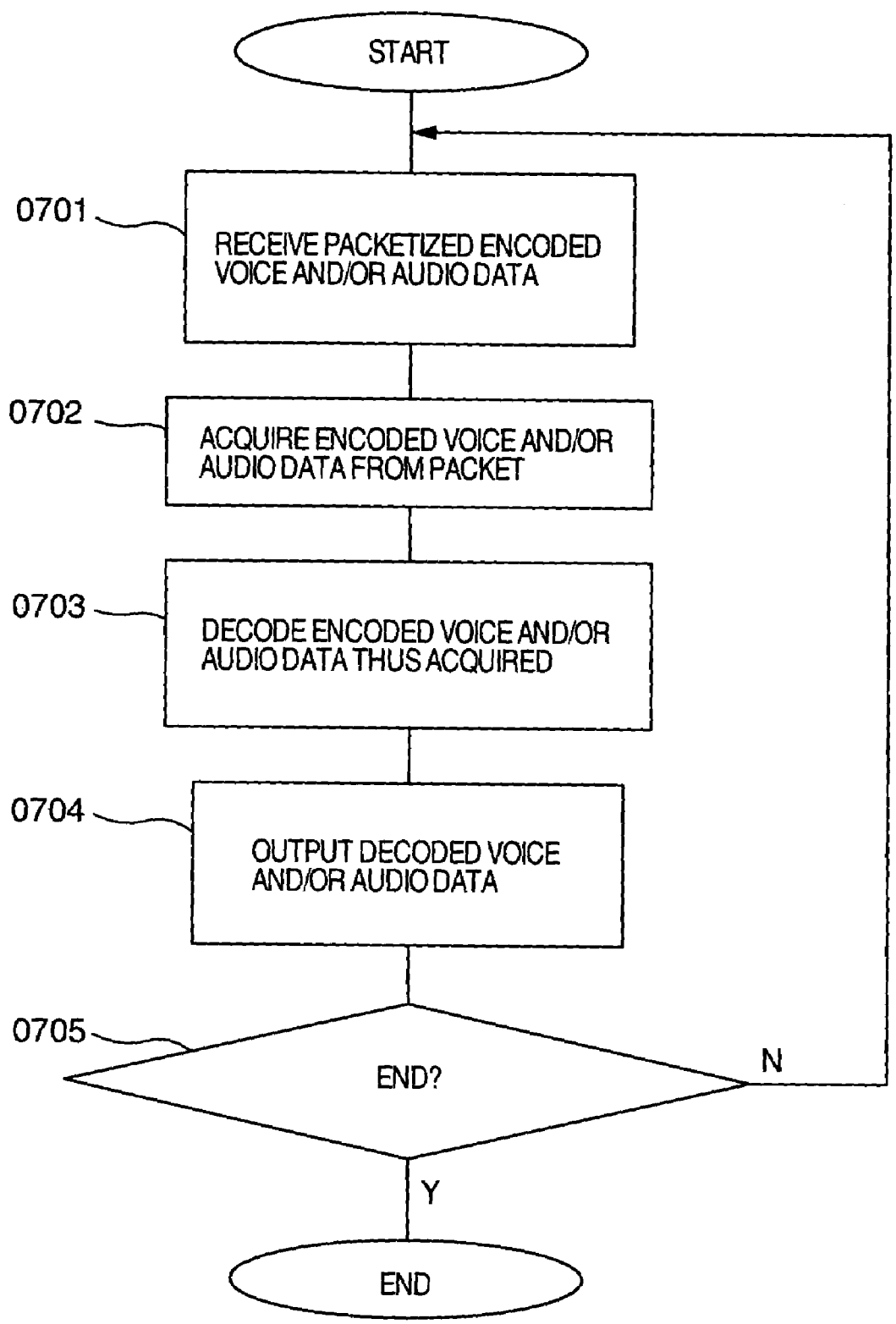
FIG. 7 is an example of a flowchart showing contents of processing of a voice reception unit in the communications terminal.

The following describes details of processing of the voice reception unit 0303 executed by the central processing unit 0201 since it is started by the control unit 0301 until it is ended by the control unit 0301 again with reference to FIG. 7. Referring to FIG. 7, there is shown an example of a flowchart illustrating contents of the processing of the voice reception unit 0303. The operation of the voice reception unit 0303 is recognized as a task separated from other components and therefore it is executed by the central processing unit 0201 in parallel with other components, that is, executed in parallel with other software components, for example.

As shown in FIG. 7, the voice reception unit 0303 first receives the packetized encoded voice data from the other terminal in communication where a voice session has already been started through the data transmitter-receiver unit 0208 (step 0701) and acquires the encoded voice data from the received packet (step 0702).

Subsequently, the voice reception unit 0303 decodes the encoded voice data (step 0703) and outputs the decoded voice data from the voice output unit 0204 (step 0704).

Then, the voice reception unit 0303 determines whether the control unit 0301 gave an instruction of terminating the voice reception unit 0303 (step 0705). Unless it determines that the control unit 0301 gave the instruction of terminating the voice reception unit 0303, it returns to the step 0701 to repeat the steps 0701 to 0705 in the above until the control unit 0301 gives the instruction of terminating the voice reception unit 0303.

On the other hand, if the voice reception unit 0303 determines that the control unit 0301 gave the instruction of terminating the voice reception unit 0303 in the above step 0705, it terminates the processing in the voice reception unit 0303.

Figure 8:
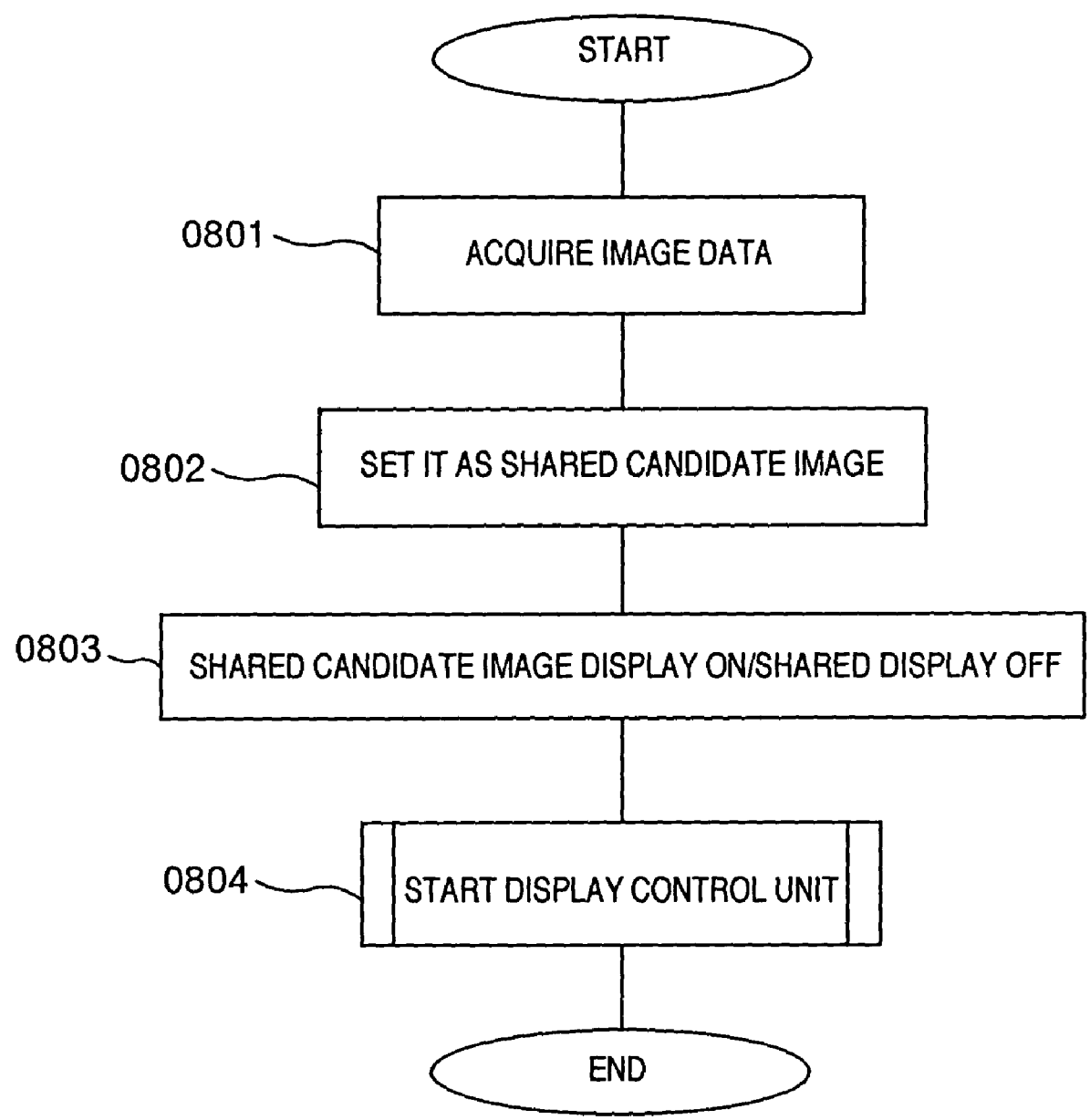
FIG. 8 is an example of a flowchart showing contents of processing of an image acquisition control unit in a communications terminal according to a first embodiment.

The following describes details of processing of the image acquisition control unit 0308 started by the control unit 0301 with reference to FIG. 8. Referring to FIG. 8, there is shown an example of a flowchart illustrating contents of the processing of the image acquisition control unit 0308.

As shown in FIG. 8, after being started, the image acquisition control unit 0308 first acquires image data from the image acquisition unit 0211 (step 0801) and sets it as a shared candidate image that is a candidate for a shared image (step 0802). It is achieved by acquiring the image data from the image acquisition unit 0211 and expanding it in the shared candidate image area on the memory/storage device 0202 or the secondary memory/storage device 0209.

Thereafter, the image acquisition control unit 0308 sets on the shared candidate image display and sets off the shared display so that the shared candidate image set in the step 0802 is displayed in the image and handwritten data display area 0404 by the display control unit 0310 described later (step 0803).

Subsequently, the image acquisition control unit 0308 starts the display control unit 0310 (step 0804) to display the shared candidate image in the image and handwritten data display area 0404 and then ends the processing of the image acquisition control unit 0308.

Figure 9:
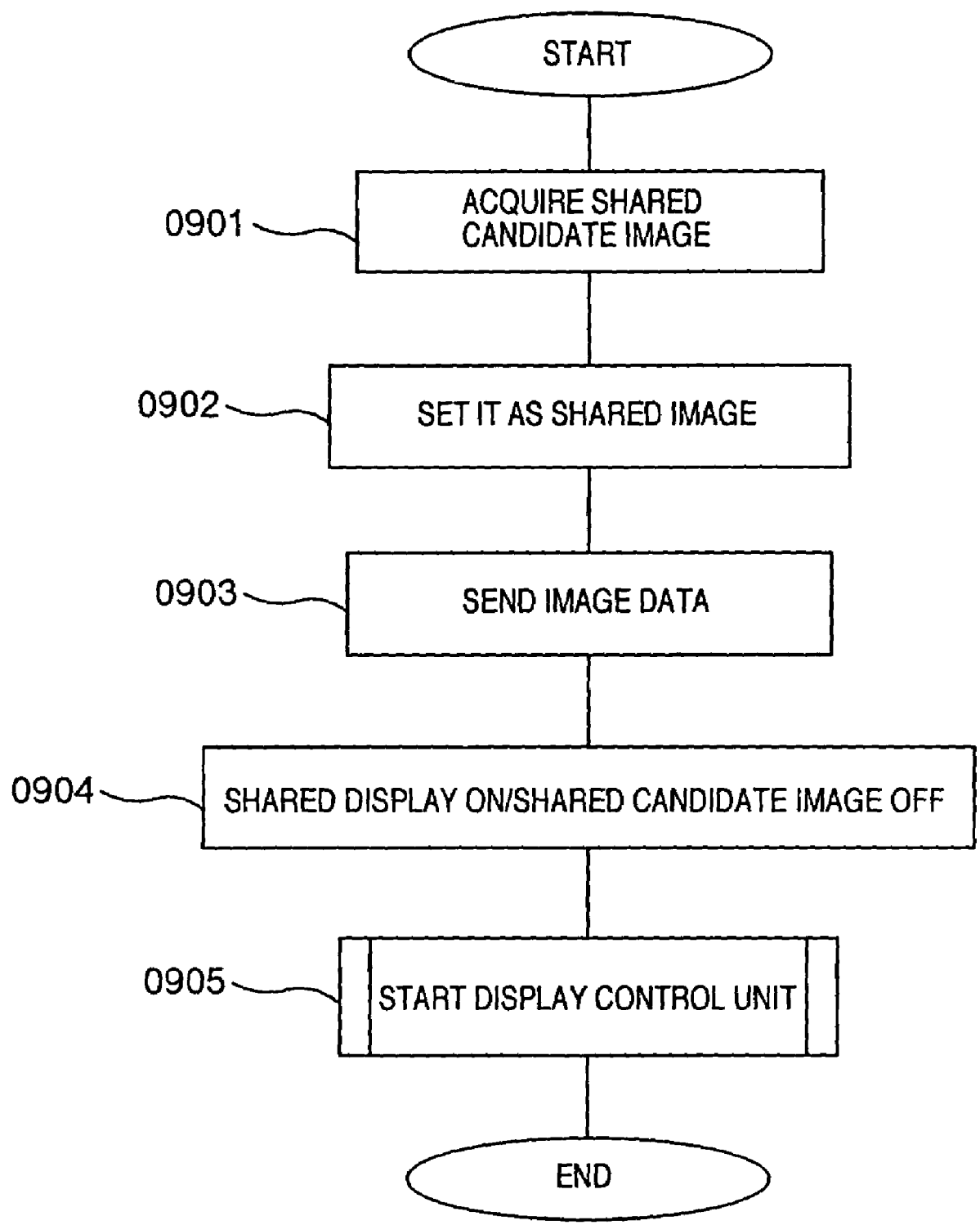
FIG. 9 is an example of a flowchart showing contents of processing of an image transmission control unit in the communications terminal according to the first embodiment.

The following describes details of processing of the image transmission control unit 0304 started by the control unit 0301 with reference to FIG. 9. Referring to FIG. 9, there is shown an example of a flowchart illustrating contents of the processing of the image transmission control unit 0304.

As shown in FIG. 9, after being started, the image transmission control unit 0304 first acquires the shared candidate image data set by the image acquisition control unit 0308 (step 0901) and sets the shared candidate image as a new shared image (step 0902). It is achieved by expanding the shared candidate image data set by the image acquisition control unit 0308 in the shared image area on the memory/storage device 0202 or the secondary memory/storage device 0209.

Subsequently, the image transmission control unit 0304 transmits data of the new shared image set in the step 0902 to the other terminal in communication through the data transmitter-receiver unit 0208 (step 0903). In this connection, the shared image data to be transmitted can be compressed before the transmission.

Subsequently, the image transmission control unit 0304 sets on the shared display and sets off the shared candidate image display so that the new shared image set in the step 0902 is displayed in the image and handwritten data display area 0404 by the display control unit 0310 described later (step 0903).

Thereafter, the image transmission control unit 0304 starts the display control unit 0310 (step 0905), displays the new shared image, which was set in the step 0902 and transmitted to the other terminal in communication in the step 0903, into the image and handwritten data display area 0404, and ends the processing of the image transmission control unit 0304.

Figure 10:
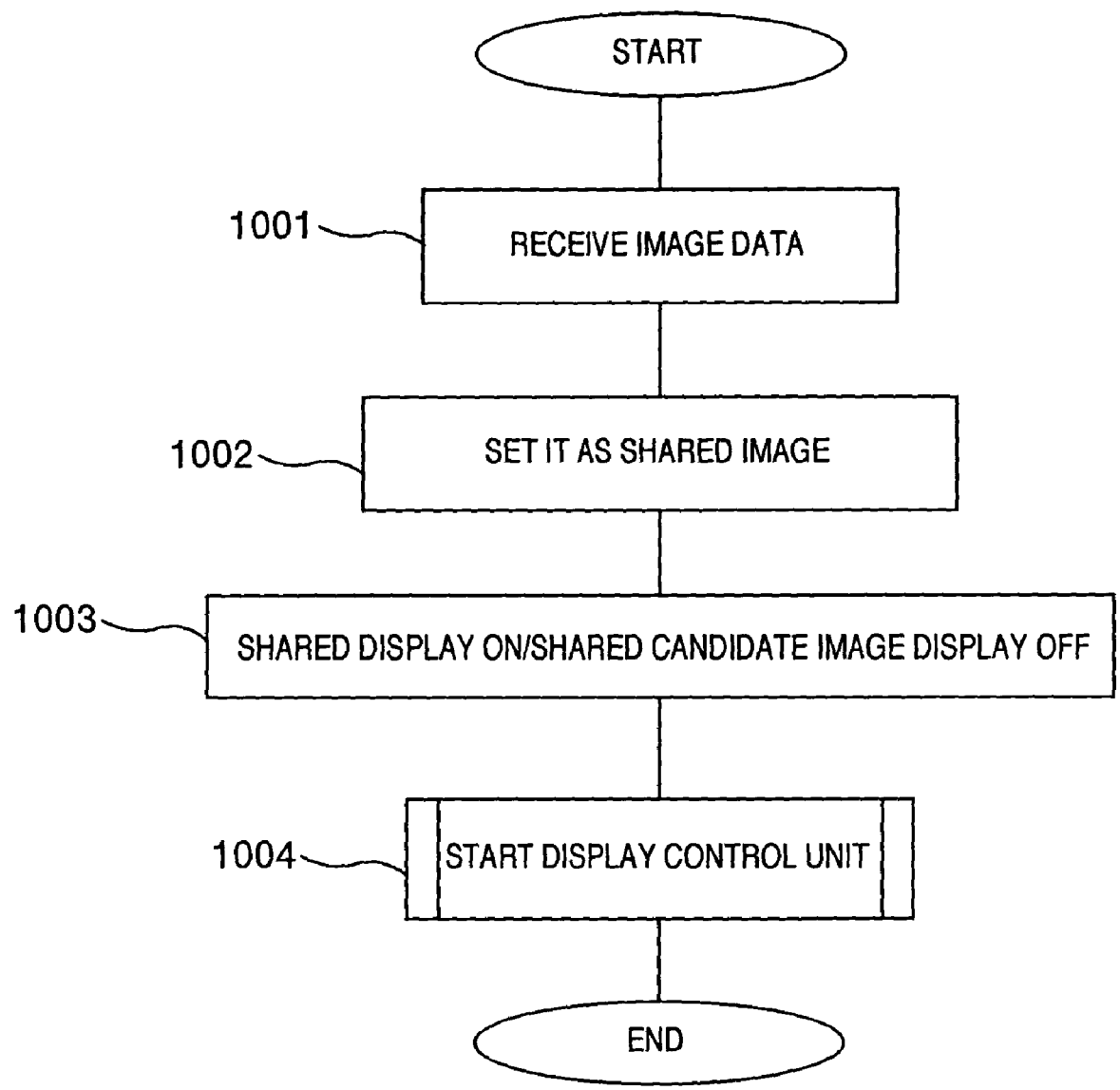
FIG. 10 is an example of a flowchart showing contents of processing of an image reception control unit in the communications terminal.

The following describes details of processing of the image reception control unit 0305 started by the control unit 0301 with reference to FIG. 10. Referring to FIG. 10, there is shown an example of a flowchart illustrating contents of the processing of the image reception control unit 0305.

As shown in FIG. 10, after being started, the image reception control unit 0305 first receives the shared image data from the other terminal in communication through the data transmitter-receiver unit 0208 (step 1001).

Subsequently, the image reception control unit 0305 sets the received shared image as a new shared image (step 1002). It is achieved by expanding data of the received shared image in the shared image area on the memory/storage device 0202 or the secondary memory/storage device 0209. If the data of the received shared image has been compressed, it is decompressed before the expansion.

Subsequently, the image reception control unit 0305 sets on the shared display and sets off the shared candidate image display so that the new shared image set in the step 1002 is displayed in the image and handwritten data display area 0404 by the display control unit 0310 described later (step 1003).

Thereafter, the image reception control unit 0305 starts the display control unit 0310 (step 1004), displays the new shared image, which was received from the other terminal in communication in the step 1001 and set in the step 1002, into the image and handwritten data display area 0404, and then ends the processing of the image reception control unit 0305.

Figure 11:
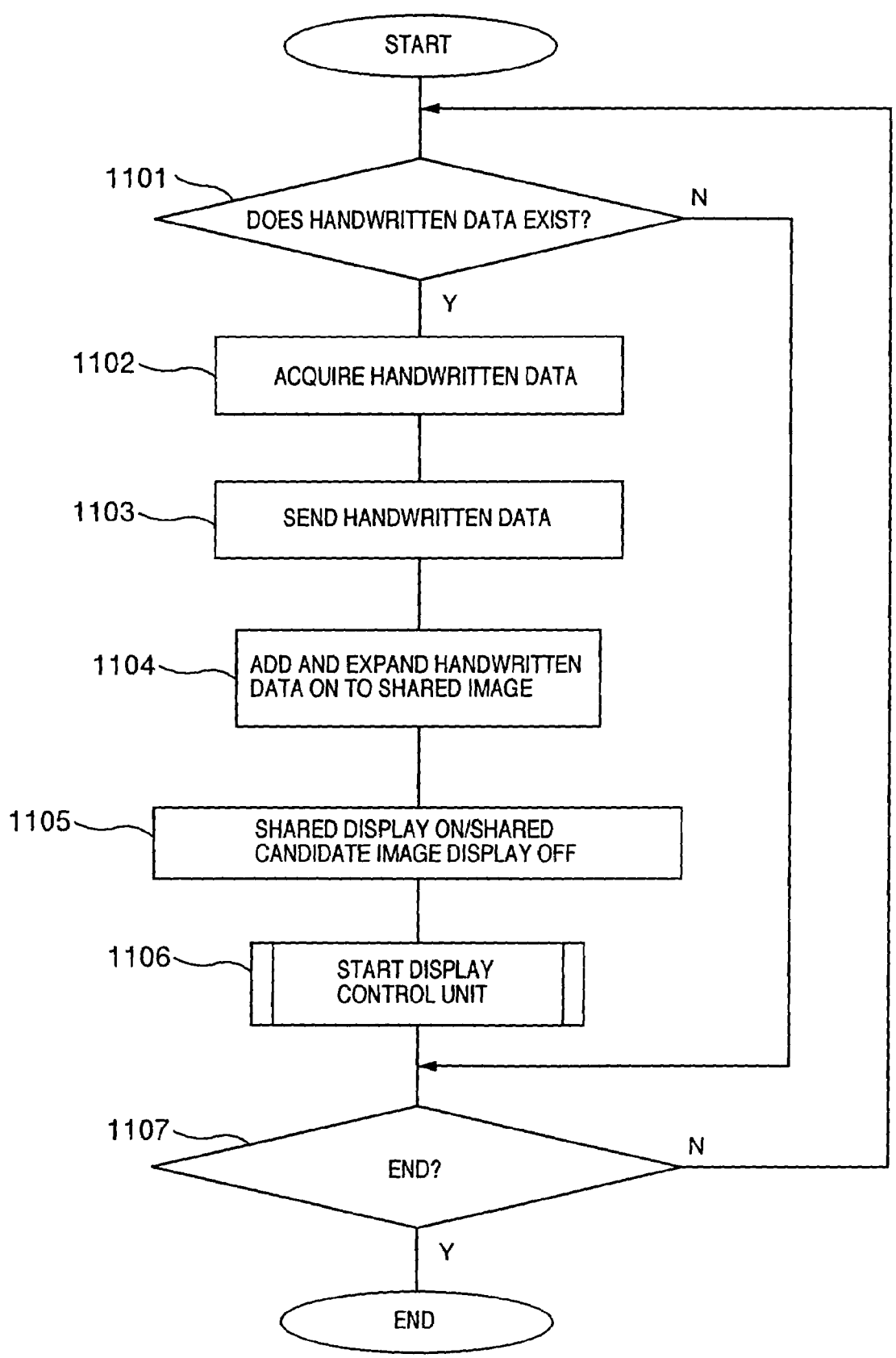
FIG. 11 is an example of a flowchart showing contents of processing of a handwritten data transmission control unit in the communications terminal.

The following describes details of processing of the handwritten data transmission control unit 0306 executed by the central processing unit 0201 since it is started by the control unit 0301 until it is ended by the control unit 0301 again with reference to FIG. 11. Referring to FIG. 11, there is shown an example of a flowchart illustrating contents of the processing of the handwritten data transmission control unit 0306. The operation of the handwritten data transmission control unit 0306 is recognized as a task separated from other components and therefore it is executed by the central processing unit 0201 in parallel with other components, that is, executed in parallel with other software components, for example.

As shown in FIG. 11, the handwritten data transmission control unit 0306 first determines whether there is any handwritten data input by the user through the handwriting input unit 0205 (step 1101). If it determines that there is no input handwritten data, it skips steps 1102 to 1106 described hereinafter.

On the other hand, if the handwritten data transmission control unit 0306 determines that there is input handwritten data as a result of the determination in the above step 1101, it acquires handwritten data input by the user by using the handwriting input unit 0205 (step 1102) and transmits the input handwritten data to the other terminal in communication through the data transmitter-receiver unit 0208 (step 1103).

Subsequently, the handwritten data transmission control unit 0306 adds and expands the transmitted or input handwritten data on to the shared image (step 1104). It is achieved by superimposing the transmitted or input handwritten data on the shared image data expanded in the shared image area on the memory/storage device 0202 or the secondary memory/storage device 0209.

Subsequently, the handwritten data transmission control unit 0306 sets on the shared display and sets off the shared candidate image display so that the shared image to which the handwritten data is added in the step 1104 is displayed in the image and handwritten data display area 0404 by the display control unit 0310 described later (step 1105).

Thereafter, the handwritten data transmission control unit 0306 starts the display control unit 0310 (step 1106) to display the shared image to which the handwritten data is added in the image and handwritten data display area 0404.

Subsequently, the handwritten data transmission control unit 0306 determines whether the control unit 0301 gave an instruction of ending the handwritten data transmission control unit 0306 (step 1107). Unless it determines that the control unit 0301 gave the instruction of ending the handwritten data transmission control unit 0306, it returns to the above step 1101 to repeat the processing of the steps 1101 to 1107 set forth in the above until the control unit 0301 gives the instruction of ending the handwritten data transmission control unit 0306. On the other hand, if the handwritten data transmission control unit 0306 determines that the control unit 0301 gave the instruction of ending the handwritten data transmission control unit 0306 as a result of the determination in the above step 1107, it ends the processing of the handwritten data transmission control unit 0306.

Figure 12:
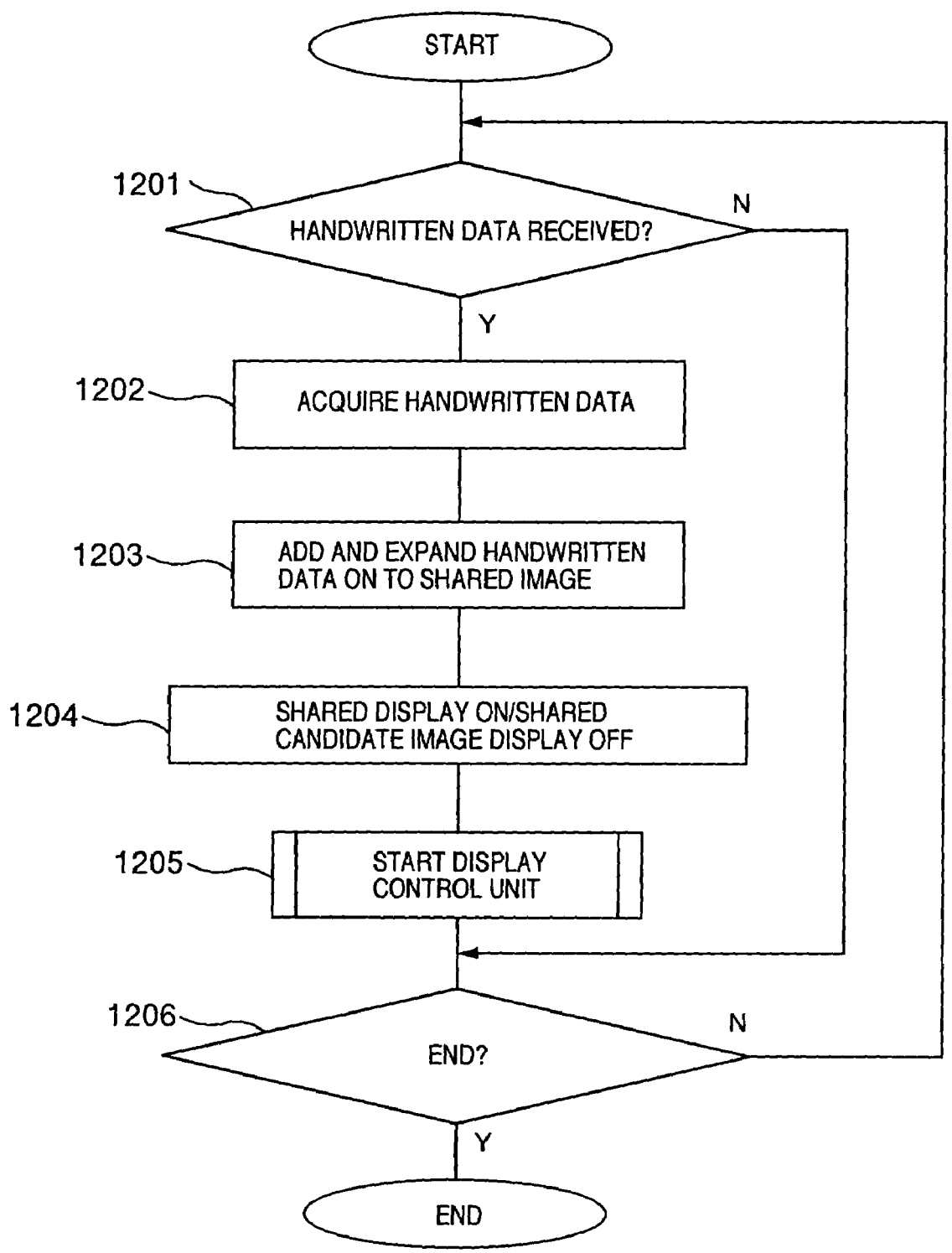
FIG. 12 is an example of a flowchart showing contents of processing of a handwritten data reception control unit in the communications terminal.

The following describes details of processing of the handwritten data reception control unit 0307 executed by the central processing unit 0201 since it is started by the control unit 0301 until it is ended by the control unit 0301 again with reference to FIG. 12. Referring to FIG. 12, there is shown an example of a flowchart illustrating contents of the processing of the handwritten data reception control unit 0307. The operation of the handwritten data reception control unit 0307 is recognized as a task separated from other components and therefore it is executed by the central processing unit 0201 in parallel with other components, that is, executed in parallel with other software components, for example.

As shown in FIG. 12, the handwritten data reception control unit 0307 first determines whether there is any handwritten data received from the other terminal in communication through the data transmitter-receiver unit 0208 (step 1201). Unless it determines that the handwritten data was received, it skips steps 1202 to 1205 described hereinafter.

On the other hand, if the handwritten data reception control unit 0307 determines that handwritten data was received as a result of the determination in the above step 1201, it acquires the received handwritten data (step 1202) and adds and expands the acquired handwritten data on to the shared image (step 1203). It is achieved by superimposing the acquired handwritten data on the shared image data expanded in the shared image area on the memory/storage device 0202 or the secondary memory/storage device 0209.

Subsequently, the handwritten data reception control unit 0307 sets on the shared display and sets off the shared candidate image display so that the shared image to which the handwritten data is added in the step 1203 is displayed in the image and handwritten data display area 0404 by the display control unit 0310 described later (step 1204). This enables automatic switching to a display of the image and handwritten data shared with the other terminal in communication if the shared candidate image is on the display when receiving the handwritten data from the other terminal in communication.

Thereafter, the handwritten data reception control unit 0307 starts the display control unit 0310 (step 1205) to display the shared image to which the handwritten data is added in the image and handwritten data display area 0404.

Subsequently, the handwritten data reception control unit 0307 determines whether the control unit 0301 gave an instruction of ending the handwritten data reception control unit 0307 (step 1206). Unless it determines that the control unit 0301 gave the instruction of ending the handwritten data reception control unit 0307, it returns to the above step 1201 to repeat the processing of the steps 1201 to 1206 set forth in the above until the control unit 0301 gives the instruction of ending the handwritten data reception control unit 0307. On the other hand, if the handwritten data reception control unit 0307 determines that the control unit 0301 gave the instruction of ending the handwritten data reception control unit 0307 as a result of the determination in the above step 1206, it ends the processing of the handwritten data reception control unit 0307.

Figure 13:
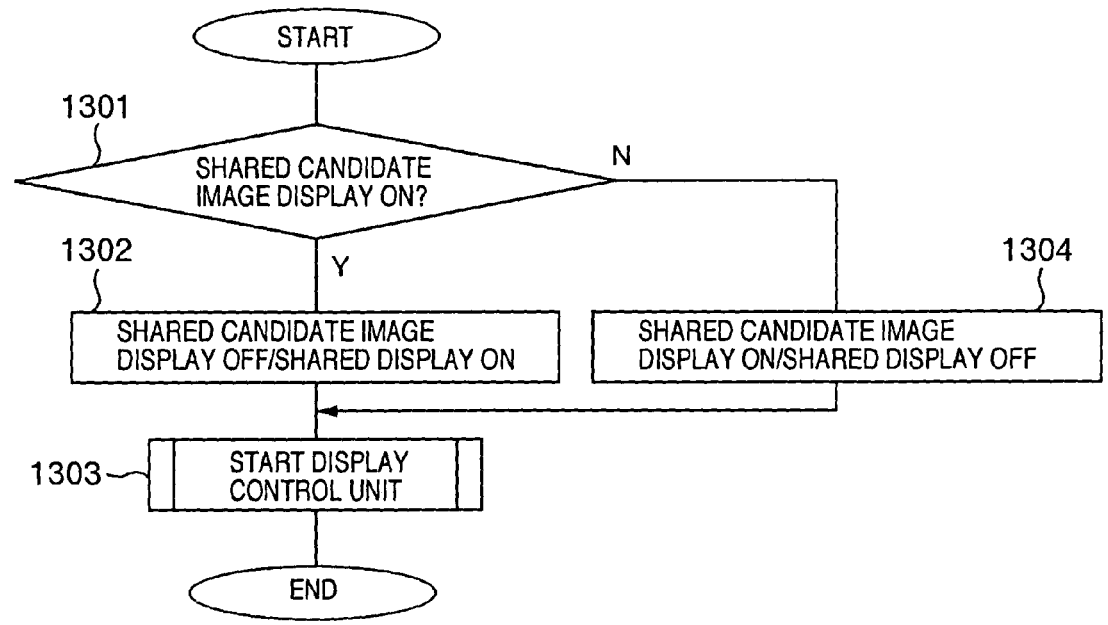
FIG. 13 is an example of a flowchart showing contents of processing of a display switching unit in the communications terminal according to the first embodiment.

The following describes details of processing of the display switching unit 0309 started by the control unit 0301 with reference to FIG. 13. Referring to FIG. 13, there is shown an example of a flowchart illustrating contents of the processing of the display switching unit 0309.

The display switching unit performs display switching between two or more images. For example, it switches the display from the currently displayed image to an image not displayed. It is assumed here that there are a shared candidate image and a shared image as the currently displayed image and the image not displayed. Note that the shared candidate image is an image input uniquely from an individual terminal and not shared with any other terminal (for example, an image input by means of a digital camera function), while the shared image is an image shared between the user's terminal and the other terminal. In this case, if the shared candidate image is currently displayed, the display switching unit switches the display from the shared candidate image to the shared image not displayed currently.

As shown in FIG. 13, the display switching unit 0309 first determines whether the shared candidate image display is ON (step 1301). If it determines that the shared candidate image display is ON, it sets off the shared candidate image display and sets on the shared display (step 1302). Then, the display switching unit starts the display control unit 0310 described later (step 1303) so that the display control unit 0310 displays the shared image currently shared with the other terminal in communication in the image and handwritten data display area 0404 and then ends the processing of the display switching unit 0309. Note that "the shared candidate image display is ON" indicates that the shared candidate image is displayed and that "the shared display is ON" indicates that the shared image is displayed.

On the other hand, unless the display switching unit 0309 determines that the shared candidate image display is ON in the above step 1301, it sets on the shared candidate image display and sets off the shared display (step 1304). Then, the display switching unit 0309 starts the display control unit 0310 described later (step 1303) so that the display control unit 0310 displays the shared candidate image acquired by the image acquisition unit 0211 in the image and handwritten data display area 0404 and then ends the processing of the display switching unit 0309.

Figure 14:
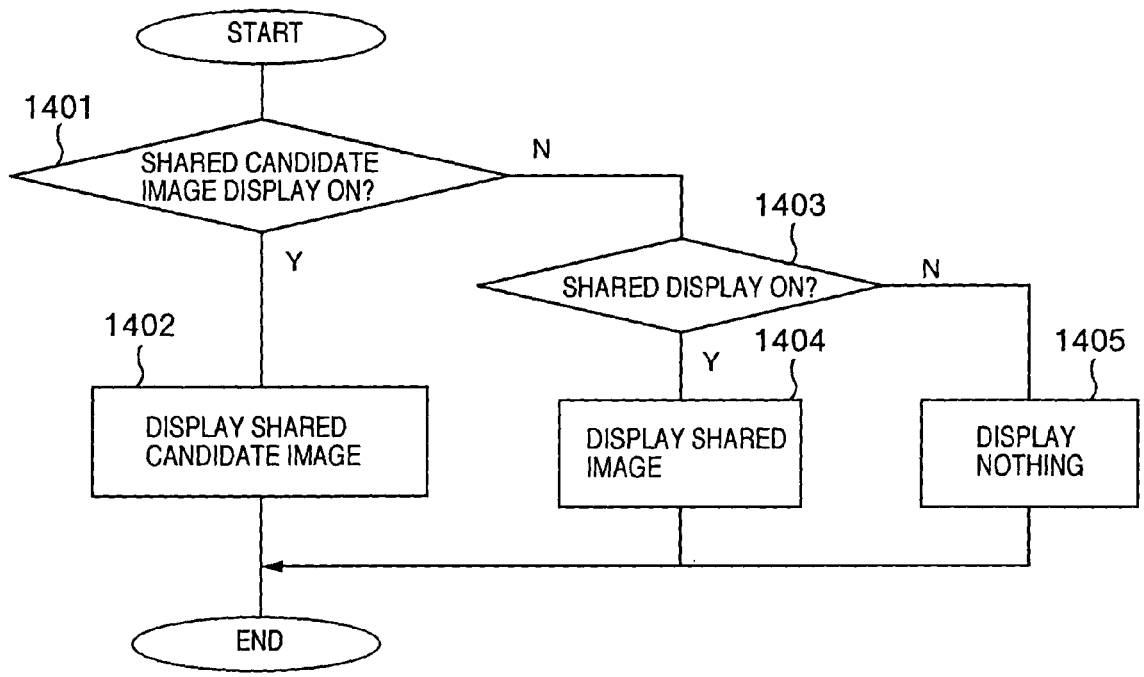
FIG. 14 is an example of a flowchart showing contents of processing of a display control unit in the communications terminal according to the first embodiment.

The following describes details of processing of the display control unit 0310 started by the image transmission control unit 0304, the image reception control unit 0305, the handwritten data transmission control unit 0306, the handwritten data reception control unit 0307, the image acquisition control unit 0308, and the display switching unit 0309, with reference to FIG. 14. Referring to FIG. 14, there is shown an example of a flowchart illustrating contents of the processing of the display control unit 0310.

As shown in FIG. 14, the display control unit 0310 first determines whether the shared candidate image display is ON (step 1401). If it determines that the shared candidate image display is ON, it displays the shared candidate image acquired by the image acquisition unit 0211 in the image and handwritten data display area 0404 on the display unit 0206 (step 1402) and then ends the processing of the display control unit 0310. The display of the shared candidate image is achieved by displaying the image currently expanded in the shared candidate image area on the memory/storage device 0202 or the secondary memory/storage device 0209 into the image and handwritten data display area 0404.

On the other hand, unless the display control unit 0310 determines that the shared candidate image display is ON in the above step 1401, it further determines whether the shared image is on (step 1403).

If the display control unit 0310 determines that the shared display is ON as a result of the determination in the step 1403, it displays the shared image currently shared with the other terminal in communication into the image and handwritten data display area 0404 on the display unit 0206 (step 1404) and then ends the processing of the display control unit 0310. The display of the shared image is achieved by displaying the image currently expanded in the shared image area on the memory/storage device 0202 or the secondary memory/storage device 0209 into the image and handwritten data display area 0404.

On the other hand, unless the display control unit 0310 determines that the shared display is ON in the step 1403, it does nothing (step 1405) and then ends the processing of the display control unit 0310.

Figure 15:
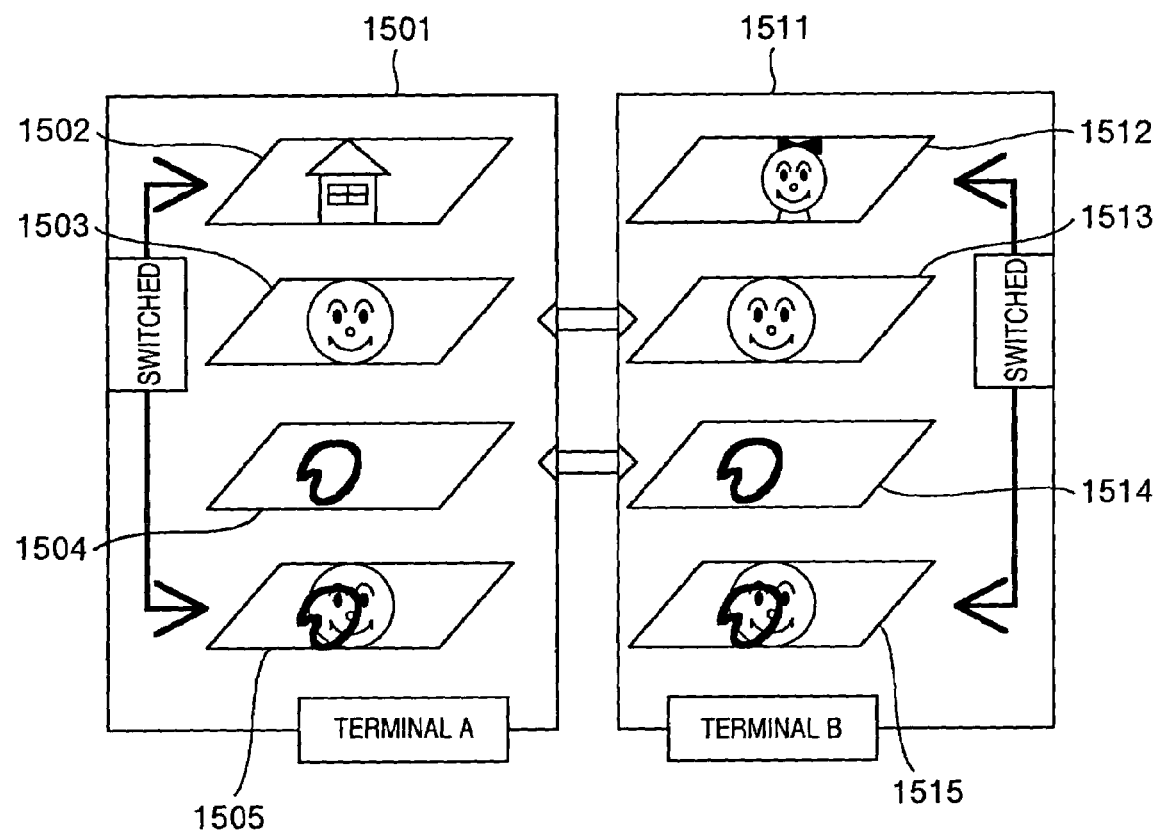
FIG. 15 is a diagram for explaining exchanges of images and handwritten data and how they are managed between two terminals communicating with each other.
Figure 16:
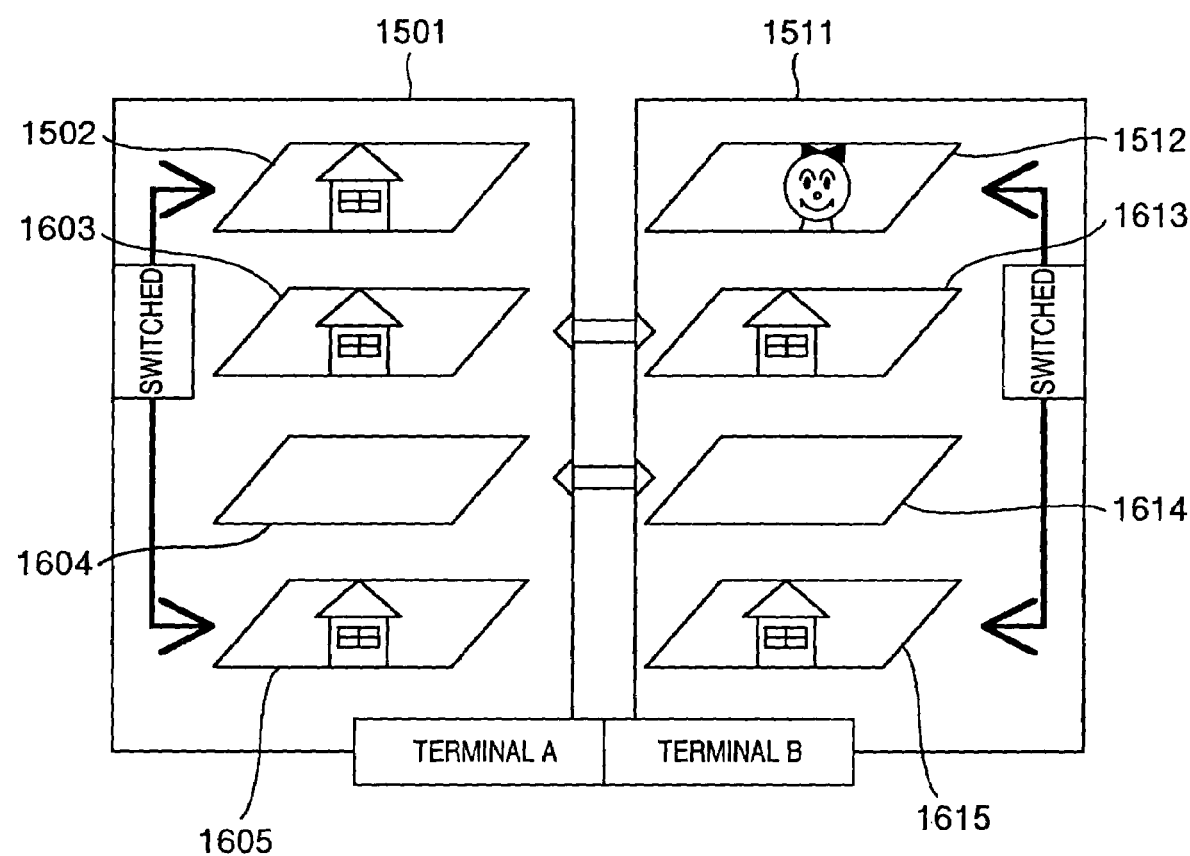
FIG. 16 is a diagram for explaining exchanges of the images and handwritten data and how they are managed between the two terminals communicating with each other after the shared candidate image is transmitted and received according to the first embodiment.

The following describes how the image and handwritten data are managed between the terminals communicating with each other by means of the control unit 0301, the image transmission control unit 0304, the image reception control unit 0305, the handwritten data transmission control unit 0306, the handwritten data reception control unit 0307, the image acquisition control unit 0308, the display switching unit 0309, and the display control unit 0310 with reference to FIG. 15 and FIG. 16.

Referring to FIG. 15 and FIG. 16, there are shown diagrams for explaining exchanges of images and handwritten data and how they are managed between two terminals communicating with each other.

Referring to FIG. 15 and FIG. 16, there are shown image and handwritten data management 1501 performed in one terminal A, image and handwritten data management 1511 performed in the other terminal B, a shared candidate image 1502 acquired by the image acquisition unit 0211 of the terminal A, a shared candidate image 1512 acquired by the image acquisition unit 0211 of the terminal B, shared images 1503, 1603, 1513, and 1613 transmitted or received between the terminal A and the terminal B, handwritten data 1504, 1604, 1514, and 1614 transmitted or received between the terminal A and the terminal B, images 1505 and 1605 in the terminal A generated by superimposing the handwritten data 1504 and 1604 transmitted or received to or from the terminal B on the shared images 1503 and 1603 transmitted or received to or from the terminal B, respectively, and images 1515 and 1615 in the terminal B generated by superimposing the handwritten data 1514 and 1614 transmitted or received to or from the terminal A on the shared images 1513 and 1613 transmitted or received to or from the terminal A, respectively.

In FIG. 15, the shared candidate image 1502 and the image 1505 are objects of display in the terminal A, while the shared candidate image 1512 and the image 1515 are objects of display in the terminal B. In this condition, if the terminal A transmits, for example, the shared image 1503 to the terminal B and the terminal B writes, for example, the handwritten data 1514 into the image and transmits it to the terminal A, the terminal A and the terminal B generate the images 1505 and the image 1515 by superimposing the shared image 1503 and the shared image 1513 on the handwritten data 1504 and the handwritten data 1514, respectively, and then display the images in the image and handwritten data display area 0404. The handwritten data can be transmitted and received bidirectionally and in real time. In this case, the terminals may update and display the image 1505 and the image 1515 whenever they transmit or receive the handwritten data.

For example, if the terminal A acquires the shared candidate image 1502 through the image acquisition unit 0211 when the image 1505 and the image 1515 are displayed in the terminal A and the terminal B, the shared candidate image 1502 is displayed in the terminal A. On the other hand, for example, if the terminal B acquires the shared candidate image 1512 through the image acquisition unit 0211, the shared candidate image 1512 is displayed in the terminal B.

If a user pushes the display switching button 0413 in the terminal A to give an instruction of switching the displayed image, the displayed image is switched between the shared candidate image 1502 and the image 1505. Similarly, if a user pushes the display switching button 0413 in the terminal B to give an instruction of switching the displayed image, the displayed image is switched between the shared candidate image 1512 and the image 1515.

Furthermore, for example, if the user pushes the image send button 0414 in the terminal A, the terminal A recognizes the shared candidate image 1502 as a new shared image 1603 and transmits the new shared image 1603 to the terminal B as shown in FIG. 16. The handwritten data 1504 transmitted and received until then is cleared at this point. The present invention, however, is not so limited, but it is possible to retain the handwritten data 1504 transmitted and received until then so that it can be superimposed on a new shared image 1603 again as handwritten data 1604. On the other hand, the terminal B receives the shared image 1603 transmitted from the terminal A and recognizes the received shared image 1603 as a new shared image 1613. The handwritten data 1514 transmitted and received until then is cleared at this point. The present invention, however, is not so limited, but it is possible to retain the handwritten data 1514 transmitted and received until then so that it can be superimposed on a new shared image 1613 again as handwritten data 1614. Thereafter, the terminal A generates and displays the image 1605 by superimposing the handwritten data 1604 on the shared image 1603. Similarly, the terminal B generates and displays the image 1615 by superimposing the handwritten data 1614 on the shared image 1613.

Thereafter, as described using FIG. 15, if a user pushes the display switching button 0413 to give an instruction of switching the displayed image in the terminal A, the displayed image is switched between the shared candidate image 1502 and the image 1605. Similarly, if a user pushes the display switching button 0413 to give an instruction of switching the displayed image in the terminal B, the displayed image is switched between the shared candidate image 1512 and the image 1615.

Figure 17:
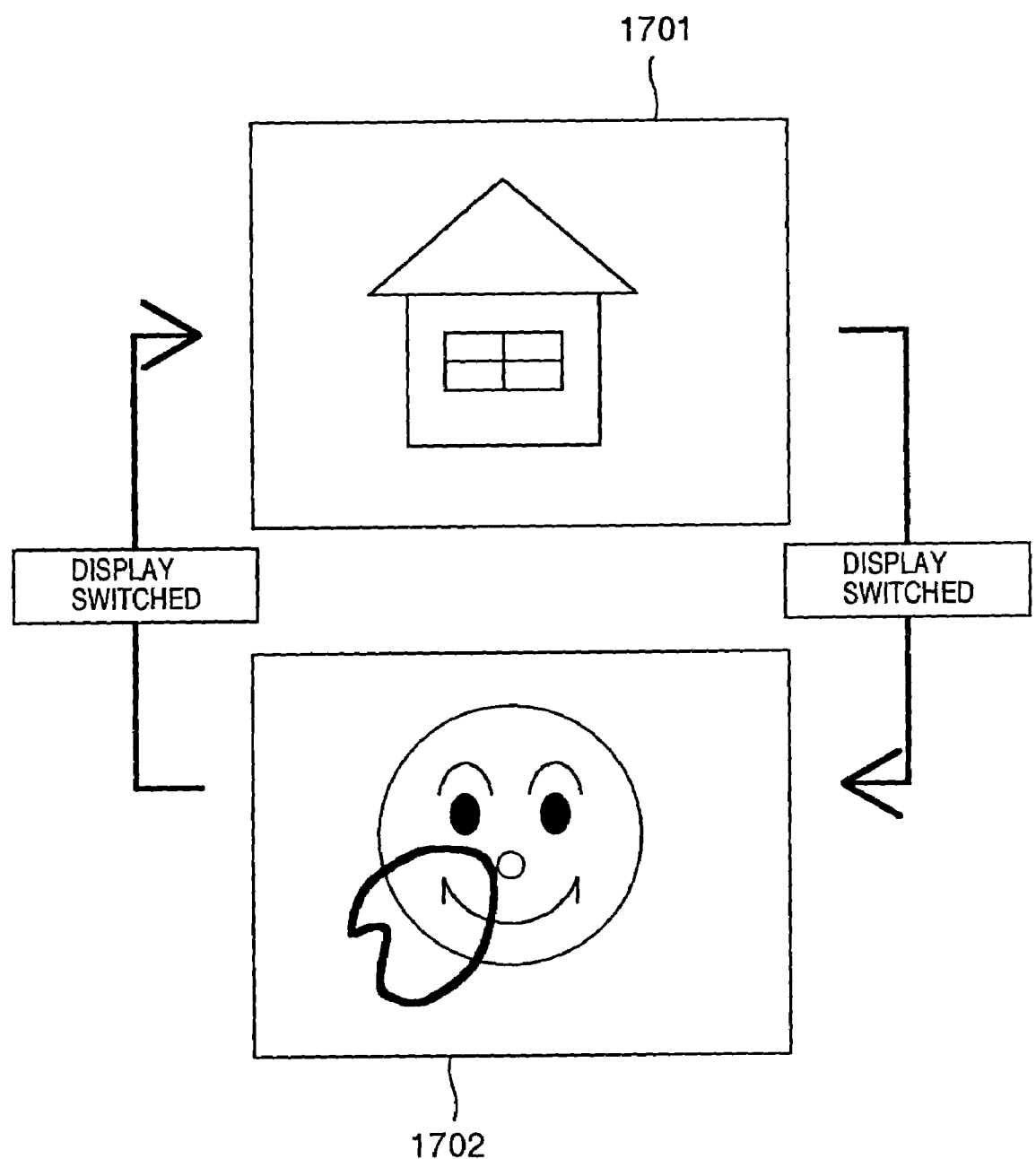
FIG. 17 is a diagram showing a sample display switching of switching a display in the communications terminal according to the first embodiment.

With this operation, as shown in FIG. 17, even if the shared candidate image acquired by the image acquisition unit 0211 is displayed in the terminal, the image can be displayed without losing the image and handwritten data shared with the other terminal. In addition, a user can switch the display among the shared candidate image, the image shared with the other terminal, and the handwritten data. Thereby, the user can communicate with the other party smoothly and can check that he or she should share the image acquired by the image acquisition unit 0211 with the other party before the transmission and can start sharing with the other party after that.

In FIG. 17, reference characters 1701 and 1702 designate the shared candidate image acquired by the image acquisition unit 0211 and the image and handwritten data shared with the other terminal, respectively.

In the first embodiment set forth hereinabove, if the shared candidate image is on the display when receiving the handwritten data from the other terminal in communication, the display can be automatically switched to the image and handwritten data shared with the other terminal. The present invention, however, is not so limited, but it is susceptible of application to an arrangement where the switching is suspended until the user explicitly switches the display between the shared candidate image and the image and handwritten data shared with the other terminal. In this case, the processing in the step 1204 described with reference to FIG. 12 may be removed so that switching to the shared image display will not occur even if the terminal receives the handwritten data.

The above first embodiment has been described with the arrangement where the display is switched between the shared candidate image and the image and handwritten data shared with the other terminal. In contrast, the second embodiment set forth hereinafter will be described with an arrangement where a shared candidate image is reduced and then superimposed and displayed on the shared image.

In the second embodiment, only the image acquisition control unit 0308, the image transmission control unit 0304, the display switching unit 0309, and the display control unit 0310 may be changed as described below in comparison with the first embodiment set forth in the above. Note that, however, the second embodiment is not concerned with the display of the shared candidate image itself as described in the first embodiment and therefore the processing of setting on or off the shared candidate image display can be removed in the processing units having the same processing contents as in the first embodiment.

Figure 18:
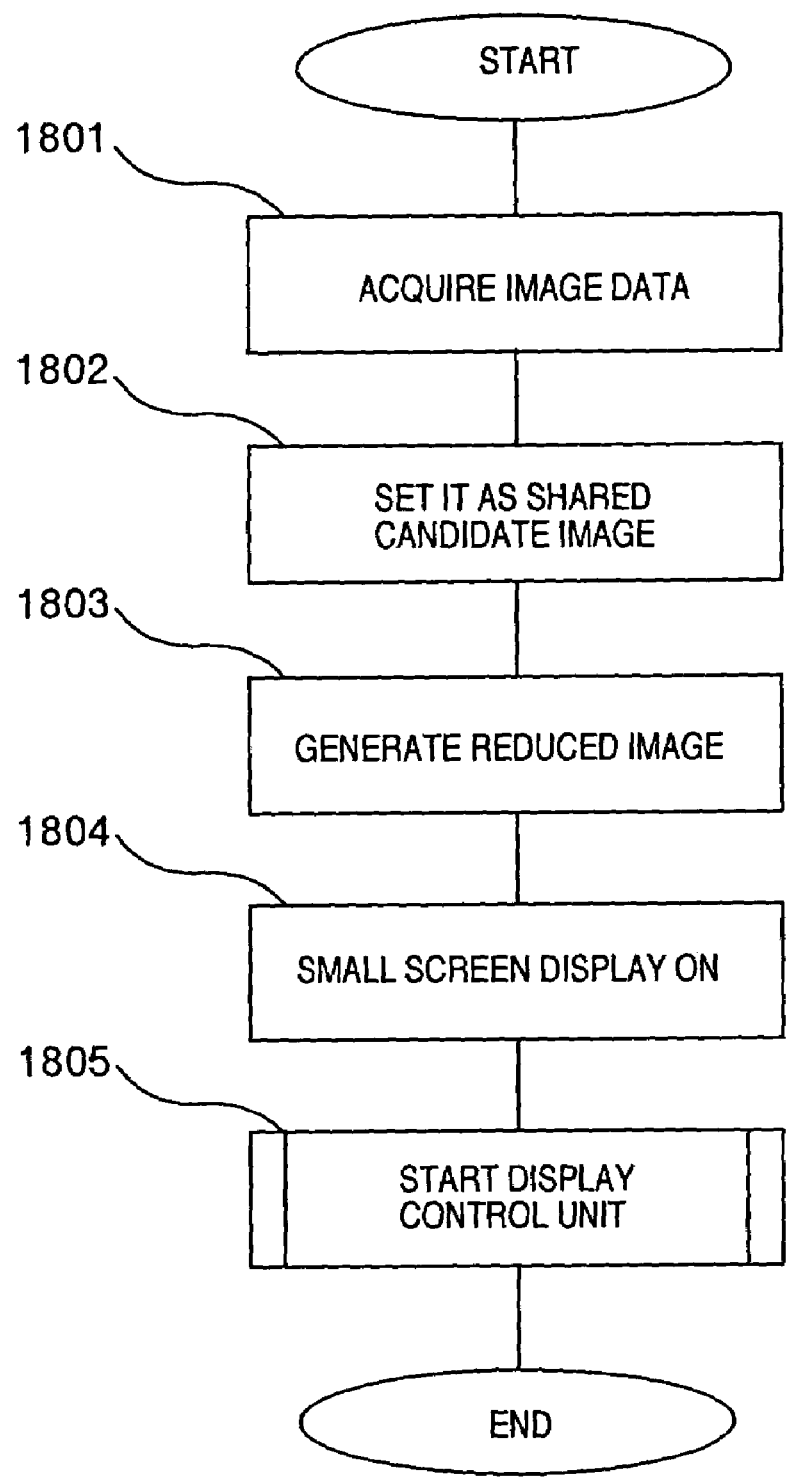
FIG. 18 is an example of a flowchart showing contents of processing of an image acquisition control unit in a communications terminal according to a second embodiment.

First, details of processing of the image acquisition control unit 0308 according to the second embodiment are described below by using FIG. 18. Referring to FIG. 18, there is shown an example of a flowchart illustrating contents of the processing of the image acquisition control unit 0308 according to the second embodiment.

As shown in FIG. 18, an image acquisition control unit 0308 according to the second embodiment acquires image data from an image acquisition unit 0211 (step 1801) and sets it as a shared candidate image with the other terminal in communication (step 1802). It is achieved by acquiring the image data from the image acquisition unit 0211 and expanding it in a shared candidate image area on a memory/storage device 0202 and a secondary memory/storage device 0209.

Subsequently, the image acquisition control unit 0308 generates a reduced image of the shared candidate image set in the step 1802 (step 1803). The generated reduced image is preferably expanded in a reduced image area on the memory/storage device 0202 or the secondary memory/storage device 0209.

Subsequently, the image acquisition control unit 0308 sets on a small screen display so that the reduced image generated in the step 1803 is displayed in an image and handwritten data display area 0404 by means of a display control unit 0310 described later (step 1804).

Subsequently, the image acquisition control unit 0308 starts the display control unit 0310 (step 1805), superimposes the reduced image of the shared candidate image generated in the step 1803 on the shared image and displays it in the image and handwritten data display area 0404, and then ends the processing of the image acquisition control unit 0308.

Figure 19:
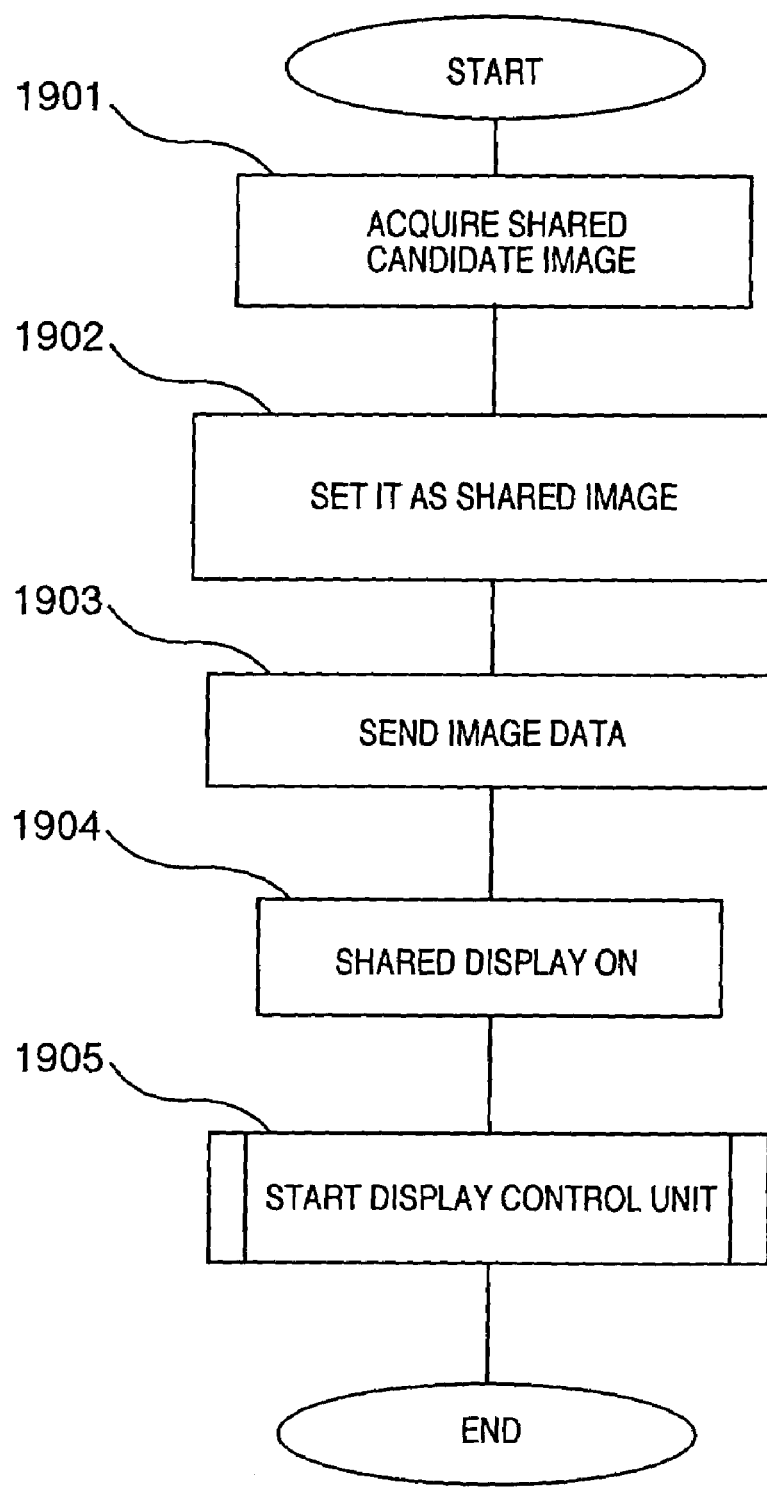
FIG. 19 is an example of a flowchart showing contents of processing of an image transmission control unit in the communications terminal according to the second embodiment.

The following describes details of processing of the image transmission control unit 0304 according to the second embodiment with reference to FIG. 19. Referring to FIG. 19, there is shown an example of a flowchart illustrating contents of the processing of the image transmission control unit 0304 according to the second embodiment.

As shown FIG. 19, the image transmission control unit 0304 according to the second embodiment first acquires data of the shared candidate image set by the image acquisition control unit 0308 (step 1901) and then sets the shared candidate image as a new shared image (step 1902). It is achieved by expanding the data of the shared candidate image set by the image acquisition control unit 0308 in a shared image area on the memory/storage device 0202 or the secondary memory/storage device 0209.

Subsequently, the image transmission control unit 0304 transmits data of the new shared image set in the step 1902 to the other terminal in communication through a data transmitter-receiver unit 0208 (step 1903). In this connection, the transmitted data of the shared image can be compressed before the transmission.

Subsequently, the image transmission control unit 0304 sets on the shared image so that the new shared image set in the step 1902 is displayed in the image and handwritten data display area 0404 by means of the display control unit 0310 described later (step 1904). In this connection, the small screen display can be set off so as to prevent the reduced image of the transmitted shared candidate image from being displayed.

Then, the image transmission control unit 0304 starts the display control unit 0310 (step 1905) to display the new shared image set in the step 1902 and transmitted to the other terminal in communication in the step 1903 into the image and handwritten data display area 0404 and then ends the processing of the image transmission control unit 0304.

Figure 20:
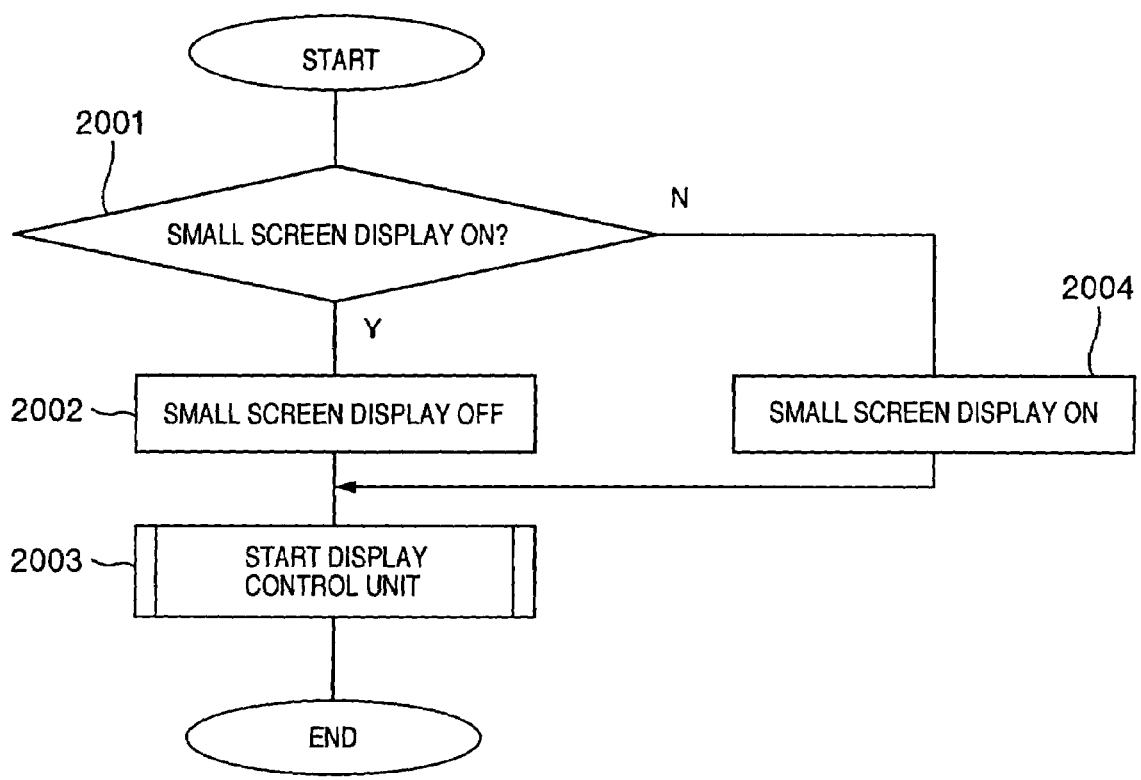
FIG. 20 is an example of a flowchart showing contents of processing of a display switching unit in the communications terminal according to the second embodiment.

The following describes details of processing of the display switching unit 0309 according to the second embodiment with reference to FIG. 20. Referring to FIG. 20, there is shown an example of a flowchart illustrating contents of the processing of the display switching unit 0309 according to the second embodiment.

As shown in FIG. 20, the display switching unit 0309 according to the second embodiment first determines whether the small screen display is ON (step 2001). If it determines that the small screen display is ON, it sets off the small screen display so that only the shared image is displayed in the image and handwritten data display area 0404 by means of the display control unit 0310 described later (step 2002).

Subsequently, the display switching unit 0309 starts the display control unit 0310 (step 2003), displays only the shared image in the image and handwritten display area 0404, and then ends the processing of the display switching unit 0309.

On the other hand, unless the display switching unit 0309 determines that the small screen display is ON, it sets on the small screen display so that the reduced image of the shared candidate image is displayed in the image handwritten data display area 0404 by means of the display control unit 0310 described later (step 2004).

Subsequently, the display switching unit 0309 starts the display control unit 0310 (step 2003), displays the reduced image of the shared candidate image in the image and handwritten data display area 0404, and then ends the processing of the display switching unit 0309.

Figure 21:
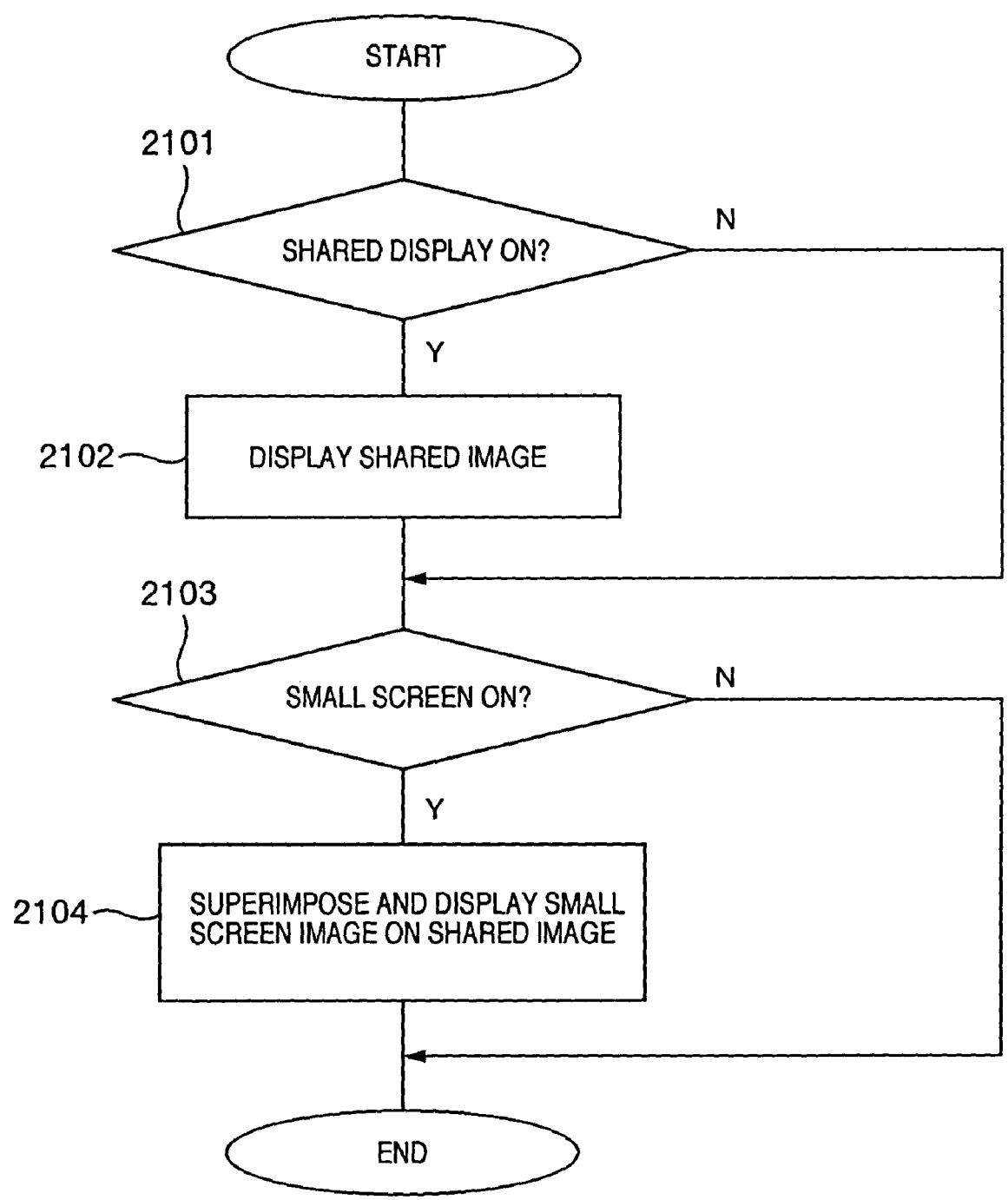
FIG. 21 is an example of a flowchart showing contents of processing of a display control unit in the communications terminal according to the second embodiment.

The following describes details of processing of the display control unit 0310 according to the second embodiment with reference to FIG. 21. Referring to FIG. 21, there is shown an example of a flowchart illustrating contents of the processing of the display control unit 0310 according to the second embodiment.

As shown in FIG. 21, the display control unit 0310 according to the second embodiment first determines whether the shared display is ON (step 2101). If it determines that the shared display is ON, it displays a shared image currently shared with the other terminal in communication in the image and handwritten data display area 0404 on the display unit 0206. The display of the shared image is achieved by displaying the image currently expanded in the shared image area on the memory/storage device 0202 or the secondary memory/storage device 0209 into the image and handwritten data display area 0404.

On the other hand, unless the display control unit 0310 determines that the shared display is ON in the above step 2101, it progresses to step 2103 without displaying the shared image.

Subsequently, the display control unit 0310 determines whether the small screen display is ON (step 2103). If it determines that the small screen display is ON, it displays the reduced image of the shared candidate image in the image and handwritten data display area 0404 on the display unit 0206 (step 2104) and then ends the processing of the display control unit 0310. In this connection, if the shared image is displayed in the step 2102, the reduced image of the shared candidate image is superimposed and displayed on the shared image. The display of the reduced image of the shared candidate image is achieved by displaying the image currently expanded in the reduced image area on the memory/storage device 0202 or the secondary memory/storage device 0209 into the image and handwritten data display area 0404.

On the other hand, if the display control unit 0310 determines that the small screen display is ON in the step 2103, it ends the processing of the display control unit 0310 without displaying the reduced image of the shared candidate image.

If the reduced image is displayed for the first time in the step 2104, the shared candidate image not reduced can be displayed for a certain period of time before the reduced image is superimposed and displayed on the shared image as shown in FIG. 22. Note that in FIG. 22 there are shown images 2201 and 2201' displayed in the image and handwritten data display area 0404 on the display unit 0206 and a shared candidate image 2202 acquired by the image acquisition unit 0211 and not reduced. Furthermore, there are shown a reduced image 2203 of the shared candidate image and a shared image 2204 currently shared with the other terminal in communication.

Figure 23:
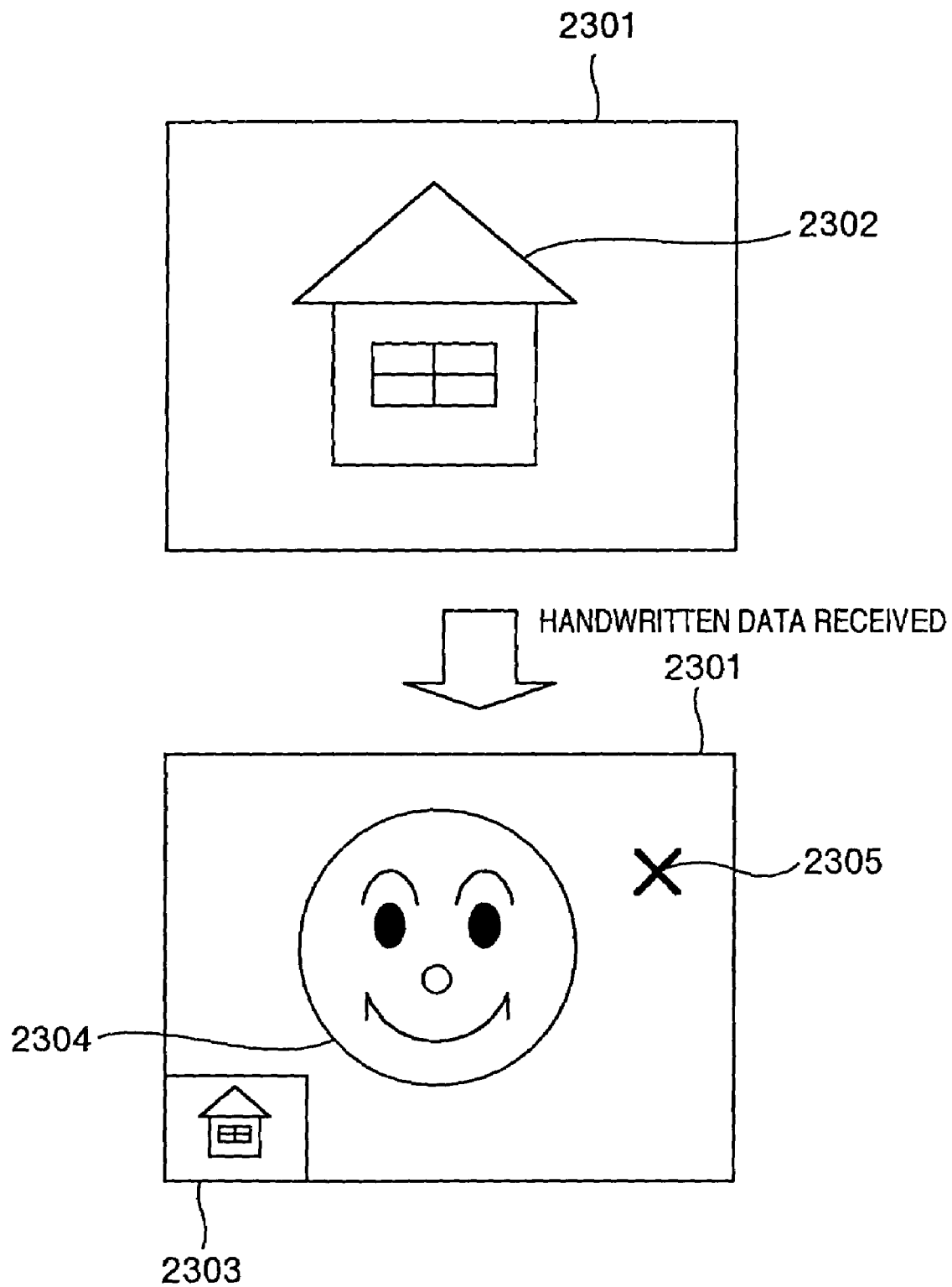
FIG. 23 is a diagram for explaining processing of displaying the shared candidate image not reduced before superimposing and displaying the reduced image of the shared candidate image on the shared image in such a way as to be triggered by a reception of handwritten data in the communications terminal according to the second embodiment.

If the reduced image is displayed for the first time in the step 2104, a shared candidate image not reduced is displayed first and thereafter the reduced image can be superimposed and displayed on the shared image in such a way as to be triggered by a reception of the handwritten data, as shown in FIG. 23. In FIG. 23, there are shown images 2301 and 2301' displayed in the image and handwritten data display area 0404 on the display unit 0206 and a shared candidate image 2302 acquired by the image acquisition unit 0211 and not reduced. Furthermore, there are shown a reduce image 2303 of the shared candidate image, a shared image 2304 currently shared with the other terminal in communication, and handwritten data 2305 received from the other terminal in communication.

Figure 24:
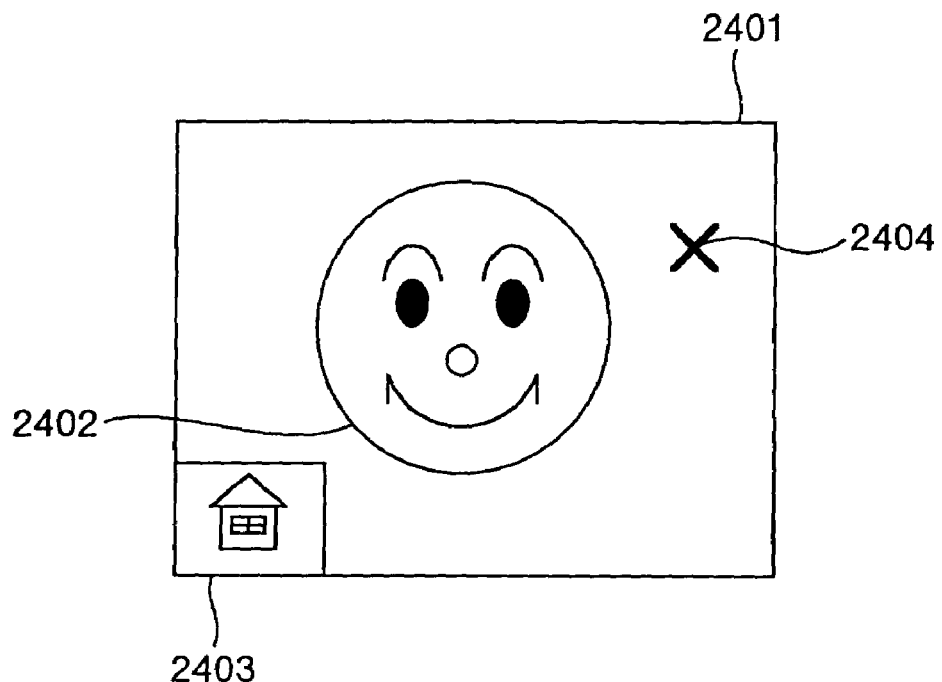
FIG. 24 is a diagram for explaining processing of displaying the reduced image of the shared candidate image in a position where transmitted or received handwritten data is surely displayed in the communications terminal according to the second embodiment.
Figure 25:
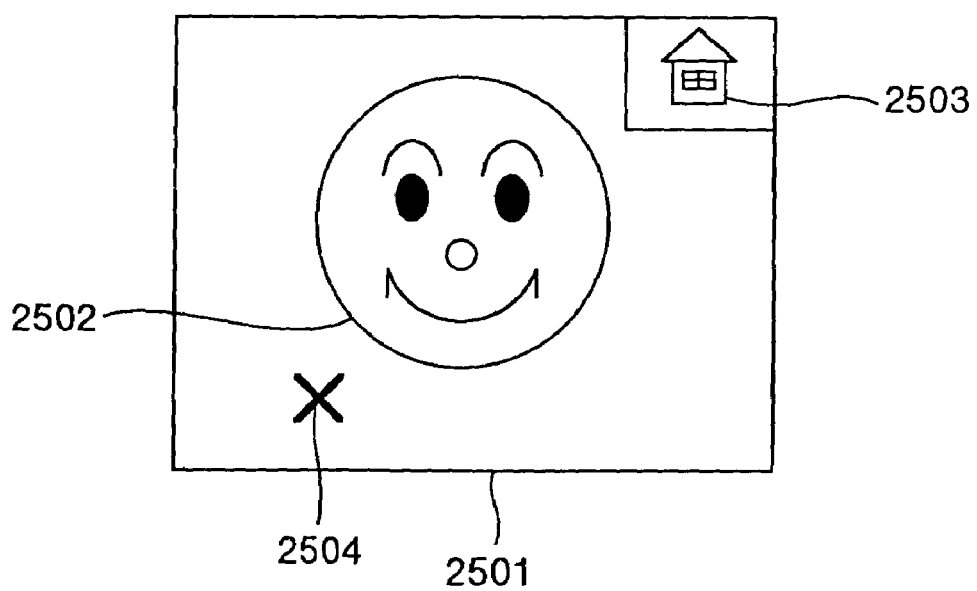
FIG. 25 is a diagram for explaining processing of displaying the reduced image of the shared candidate image in a position where transmitted or received handwritten data is surely displayed in the communications terminal according to the second embodiment.

Furthermore, if the reduced image is displayed in the step 2104, preferably it is displayed in a position where the handwritten data exchanged with the other terminal in communication is surely displayed, in other words, where the handwritten data is not hidden while it is transmitted or received as shown in FIG. 24 and FIG. 25. Specifically, it is preferably displayed in a position far from the display position of the handwritten data being transmitted or received. In FIG. 24 and FIG. 25, there are shown images 2401 and 2501 displayed in the image and handwritten data display area 0404 on the display unit 0206, shared images 2402 and 2502 currently shared with the other terminal in communication, reduced images 2403 and 2503 of the shared candidate image, and handwritten data 2404 and 2504 transmitted or received to or from the other terminal in communication.

Figure 26:
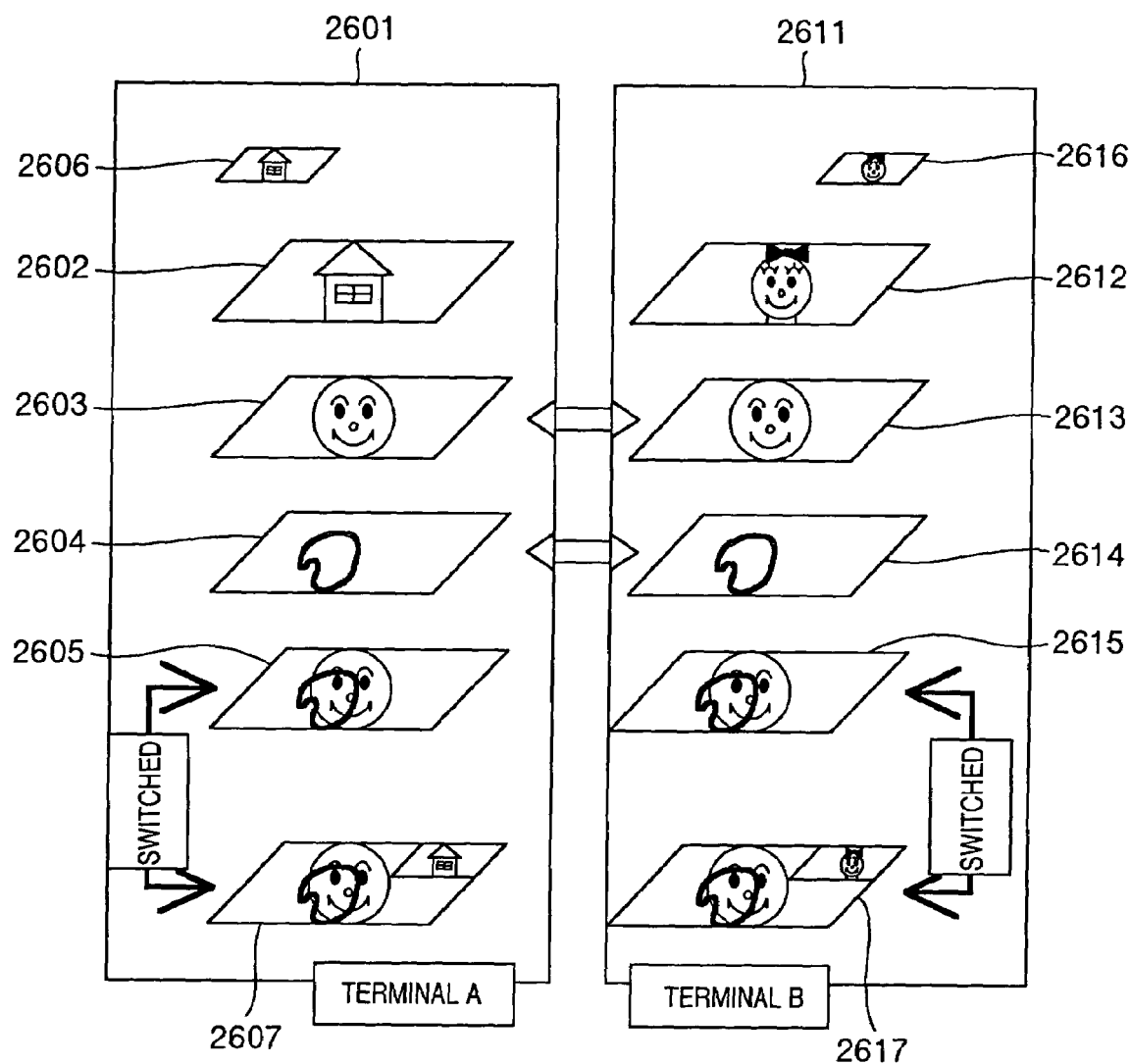
FIG. 26 is a diagram for explaining exchanges of images and handwritten data and how they are managed between two terminals communicating with each other according to the second embodiment.
Figure 27:
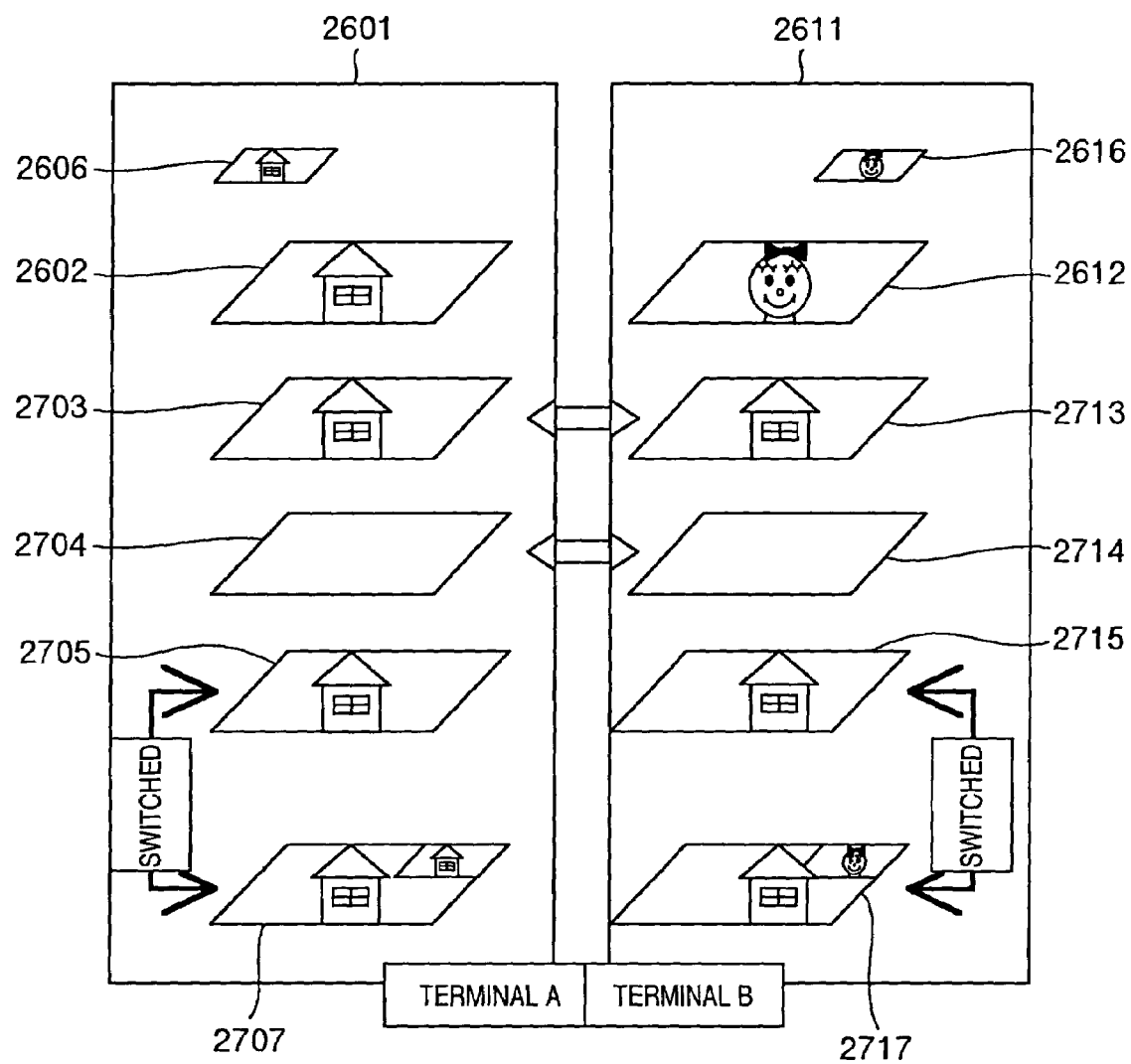
FIG. 27 is a diagram for explaining exchanges of the images and handwritten data and how they are managed between the two terminals communicating with each other after the shared candidate image is transmitted and received according to the second embodiment.

The following describes how the image and handwritten data are exchanged and managed between the terminals in communication in the second embodiment with reference to FIG. 26 and FIG. 27.

Referring to FIG. 26 and FIG. 27, there are shown diagrams for explaining exchanges of images and handwritten data and how they are managed between two terminals communicating with each other.

In FIG. 26 and FIG. 27, there are shown image and handwritten data management 2601 performed in one terminal A, image and handwritten data management 2611 performed in the other terminal B, a shared candidate image 2602 acquired by the image acquisition unit 0211 of the terminal A, a shared candidate image 2612 acquired by the image acquisition unit 0211 of the terminal B, a reduced image 2606 of the shared candidate image 2602 in the terminal A, a reduced image 2616 of the shared candidate image 2612 in the terminal B, shared images 2603, 2703, 2613, and 2713 transmitted and received between the terminal A and the terminal B, handwritten data 2604, 2704, 2614, and 2714 transmitted and received between the terminal A and the terminal B, images 2605 and 2705 in the terminal A generated by superimposing the handwritten data 2604 and 2704 transmitted or received to or from the terminal B on the shared images 2603 and 2703 transmitted or received to or from the terminal B, respectively, images 2615 and 2715 in the terminal B generated by superimposing the handwritten data 2614 and 2714 transmitted or received to or from the terminal A on the shared images 2613 and 2713 transmitted or received to or from the terminal A, respectively, images 2607 and 2707 in the terminal A generated by superimposing the handwritten data 2604 and 2704 transmitted or received to or from the terminal B on the shared images 2603 and 2703 transmitted or received to or from the terminal B and further superimposing the reduced image 2606 of the shared candidate image on the images, respectively, and images 2617 and 2717 in the terminal B generated by superimposing the handwritten data 2614 and 2714 transmitted or received to or from the terminal A on the shared images 2613 and 2713 transmitted or received to or from the terminal A and further superimposing the reduced image 2616 of the shared candidate image on the images, respectively.

In FIG. 26, the image 2605 and the image 2607 are objects of display in the terminal A, while the image 2615 and the image 2617 are objects of display in the terminal B. In this condition, if the terminal A transmits, for example, the shared image 2603 to the terminal B and the terminal B writes, for example, the handwritten data 2614 into the image and transmits it to the terminal A, the terminal A and the terminal B generate the image 2605 and the image 2615 by superimposing the shared image 2603 and the shared image 2613 on the handwritten data 2604 and the handwritten data 2614, respectively, and then display the images in the image and handwritten data display area 0404. The handwritten data can be transmitted and received bidirectionally and in real time. In this case, the terminals may update and display the image 2605 and the image 2615 whenever they transmit or receive the handwritten data.

For example, if the terminal A acquires the shared candidate image 2602 through the image acquisition unit 0211 when the image 2605 and the image 2615 are displayed in the terminal A and the terminal B, respectively, the terminal A generates the reduced image 2606 of the shared candidate image. On the other hand, for example, if the terminal B acquires the shared candidate image 2612 through the image acquisition unit 0211, the terminal B generates the reduced image 2616 of the shared candidate image. In addition, the terminal A generates the image 2607 by further superimposing the reduced image 2606 of the shared candidate image on the image 2605 and displays it in the image and handwritten data display area 0404. Similarly, the terminal B generates the image 2617 by further superimposing the reduced image 2616 of the shared candidate image on the image 2615 and displays it in the image and handwritten data display area 0404.

In this condition, if the user pushes the display switching button 0413 to give an instruction of switching the displayed image in the terminal A, the displayed image is switched between the image 2605 and the image 2607. Similarly, if the user pushes the display switching button 0413 to give an instruction of switching the displayed image in the terminal B, the displayed image is switched between the image 26052 and the image 2607.

Furthermore, for example, if the user pushes the image send button 0414 in the terminal A, the terminal A recognizes the shared candidate image 2602 as a new shared image 2703 and transmits the new shared image 2703 to the terminal B as shown in FIG. 27. The handwritten data 2604 transmitted and received until then is cleared at this point. The present invention, however, is not so limited, but it is possible to retain the handwritten data 2604 transmitted and received until then so that it can be superimposed on a new shared image 2703 again as handwritten data 2704. On the other hand, the terminal B receives the shared image 2703 transmitted from the terminal A and recognizes the received shared image 2703 as a new shared image 2713. The handwritten data 2614 transmitted and received until then is cleared at this point. The present invention, however, is not so limited, but it is possible to retain the handwritten data 2614 having been transmitted and received until then so that it can be superimposed on a new shared image 2713 again as handwritten data 2714. Thereafter, the terminal A generates and displays the image 2705 by superimposing the handwritten data 2704 on the shared image 2703 and then generates the image 2707 by superimposing the handwritten data 2704 on the shared image 2703 and the reduced image 2606 of the shared candidate image on it. On the other hand, the terminal B generates and displays the image 2715 by superimposing the handwritten data 2714 on the shared image 2713 and then generates the image 2717 by superimposing the handwritten data 2714 on the shared image 2713 and the reduced image 2616 of the shared candidate image on it.

Thereafter, as described using FIG. 26, if the user pushes the display switching button 0413 to give an instruction of switching the displayed image in the terminal A, the displayed image is switched between the image 2705 and the image 2707. Similarly, if the user pushes the display switching button 0413 to give an instruction of switching the displayed image in the terminal B, the displayed image is switched between the image 2715 and the image 2717.

Figure 28:
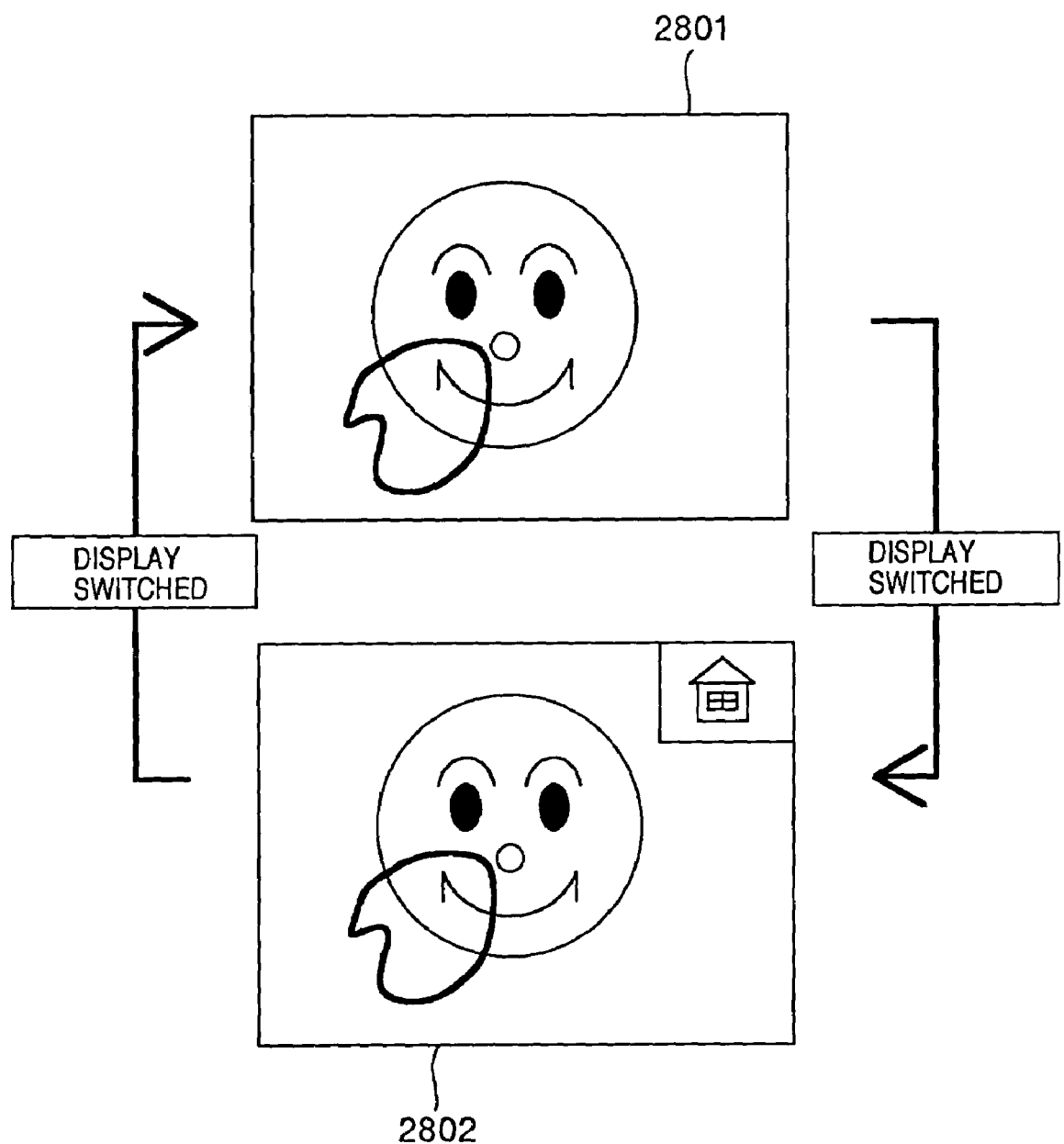
FIG. 28 is a diagram showing a sample display switching of switching a display in the communications terminal according to the second embodiment.

With this operation, as shown in FIG. 28, even if the shared candidate image acquired by the image acquisition unit 0211 is displayed in the terminal, the image is displayed without losing the image and handwritten data shared with the other terminal. In addition, the terminal can display the shared candidate image acquired by the image acquisition unit 0211 while displaying the image and handwritten data shared with the other terminal, thereby enabling smooth communication. Furthermore, a user can check the shared candidate image before sharing it with the other terminal in communication, thereby preventing an unfavorite image from being transmitted to the other terminal and therefore removing difficulties in use.

In FIG. 28, there are shown an illustration 2801 of the image and handwritten data shared with the other terminal and an illustration 2802 of the reduced image of the shared candidate image generated by the image acquisition control unit 0308 superimposed on the image and handwritten data shared with the other terminal.

The second embodiment has been described hereinabove focusing on the arrangement in which the reduced image of the shared candidate image is generated and displayed on the shared image. In contrast, a third embodiment will be described hereinafter, focusing on an arrangement enabling switching among a display of only a shared image, a display of only a shared candidate image, and a display of a reduced image of the shared candidate image superimposed on the shared image.

In the third embodiment, only the image acquisition control unit 0308, the image transmission control unit 0304, the display switching unit 0309, and the display control unit 0310 may be changed as described below, in comparison with the second embodiment in the above. Note that, however, the following description is made on the assumption that the processing of setting on or off the shared candidate image display is not removed in the processing units of the second embodiment having the same processing contents as in the first embodiment since the shared candidate image itself is displayed in some cases in the third embodiment.

Figure 29:
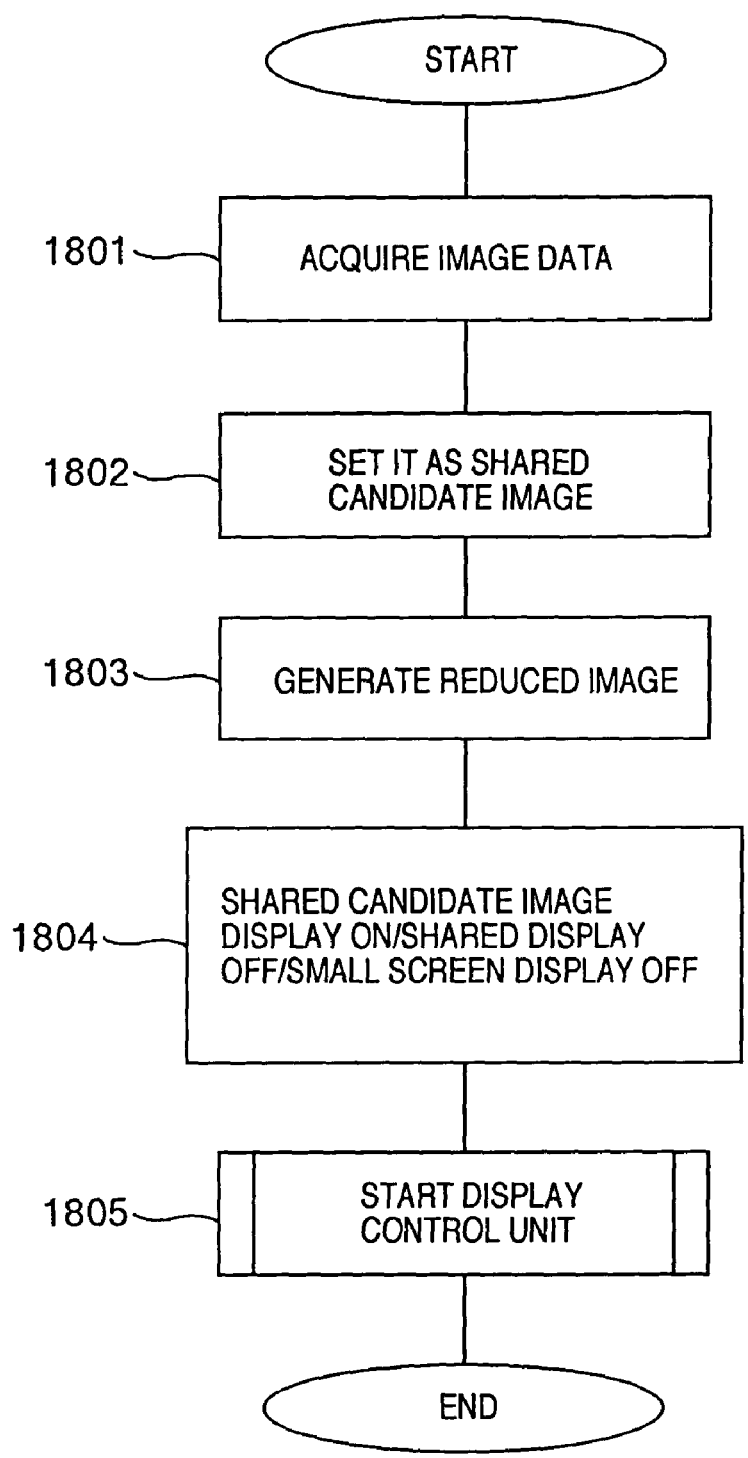
FIG. 29 is an example of a flowchart showing contents of processing of an image acquisition control unit in a communications terminal according to a third embodiment.

First, the following describes details of processing of an image acquisition control unit 0308 according to the third embodiment with reference to FIG. 29. Referring to FIG. 29, there is shown an example of a flowchart illustrating contents of the processing of the image acquisition control unit 0308 according to the third embodiment.

As shown in FIG. 29, processing contents of the image acquisition control unit 0308 according to the third embodiment are almost the same as those of the image acquisition control unit 0308 according to the second embodiment described with reference to FIG. 18. The processing of the image acquisition control unit 0308 according to the third embodiment, however, may be changed in such a way that a shared candidate image display is set on, a shared display is set off, and a small screen display is set off as shown in step 2904, though the small screen display is set on in the step 1804 in the processing of the image acquisition control unit 0308 according to the second embodiment described above. Thereby, a shared candidate image not reduced is displayed in the image and handwritten data display area 0404 immediately after the shared candidate image is acquired, so that a user can check the reception of the image in an actual image size on the screen.

In FIG. 29, like reference numerals refer to the same processes as in FIG. 18. Their detailed description is omitted here since it is the same as one in FIG. 18.

Figure 30:
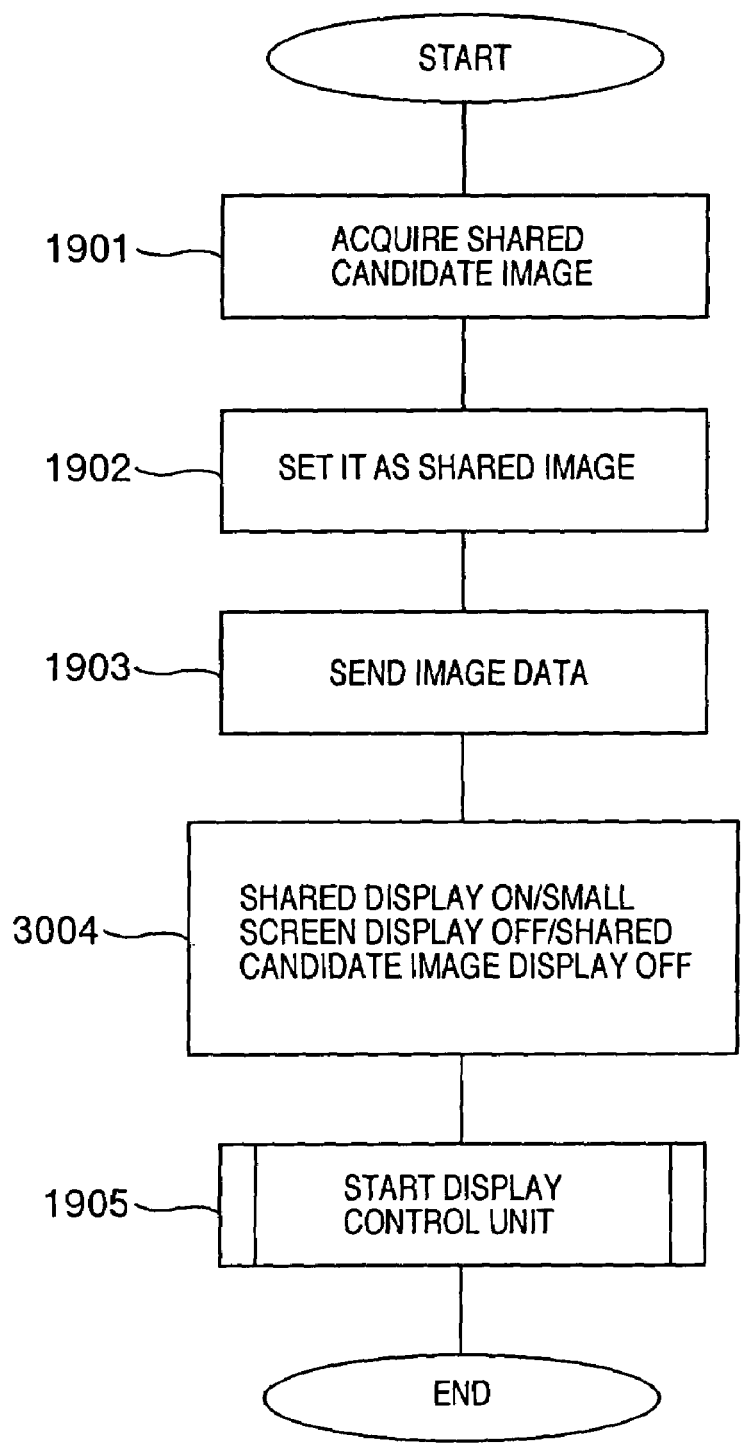
FIG. 30 is an example of a flowchart showing contents of processing of an image transmission control unit in the communications terminal according to the third embodiment.

The following describes details of processing of the image transmission control unit 0304 according to the third embodiment with reference to FIG. 30. Referring to FIG. 30, there is shown an example of a flowchart illustrating contents of the processing of the image transmission control unit 0304 according to the third embodiment.

As shown in FIG. 30, the processing contents of the image transmission control unit 0304 according to the third embodiment are almost the same as those of the image transmission control unit 0304 according to the second embodiment described with reference to FIG. 19 in the above. The processing of the image transmission control unit 0304 according to the third embodiment, however, may be changed in such a way that the shared display is set on, the small screen display is set off, and the shared candidate image display is set off as shown in step 3004, though the shared display is set on in the step 1904 in the processing of the image transmission control unit 0304 according to the second embodiment described above. Thereby, after a new shared image is transmitted to the other terminal in communication, the new shared image is displayed, thereby enabling smooth communication.

In FIG. 30, like reference numerals refer to the same processes as in FIG. 19. Their detailed description is omitted here since it is the same as one in FIG. 19.

Figure 31:
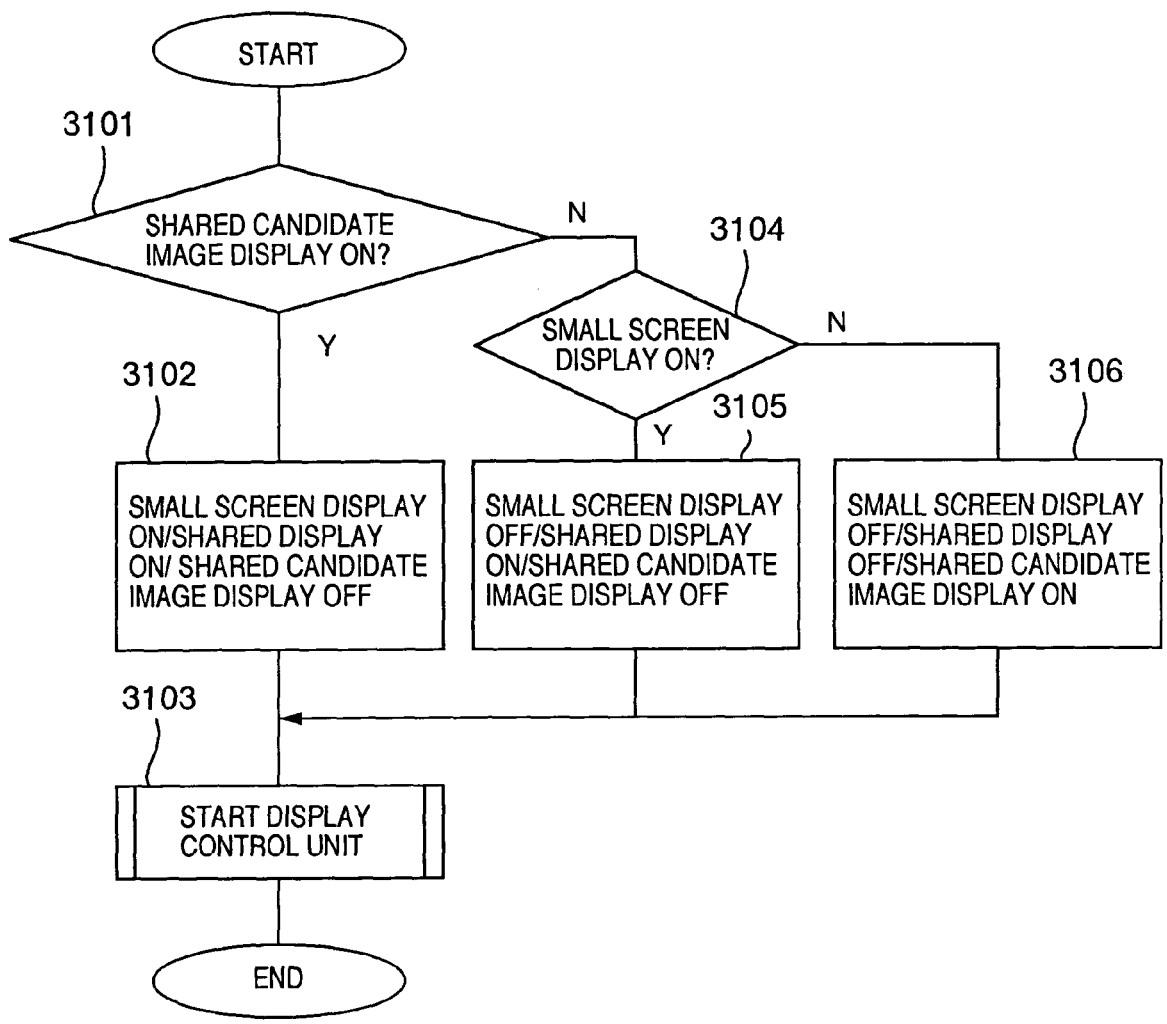
FIG. 31 is an example of a flowchart showing contents of processing of a display switching unit in the communications terminal according to the third embodiment.

The following describes details of processing of the display switching unit 0309 according to the third embodiment with reference to FIG. 31. Referring to FIG. 31, there is shown an example of a flowchart illustrating contents of the processing of the display switching unit 0309 according to the third embodiment.

As shown in FIG. 31, the display switching unit 0309 according to the third embodiment first determines whether the shared candidate image display is ON (step 3101). If it determines that the shared candidate image display is ON, it sets on the small screen display, sets on the shared display, and sets off the shared candidate image display (step 3102). Thereafter, it starts a display control unit 0310 described later (step 3103) so that a reduced image of the shared candidate image is displayed in the image and handwritten data display area 0404 by means of the display control unit 0310 and then ends the processing of the display switching unit 0309.

On the other hand, unless the display switching unit 0309 determines that the shared candidate image display is ON in the step 3101, it further determines whether the small screen display is ON (step 3104). If it determines that the small screen display is ON, it sets off the small screen display, sets off the shared candidate image display, and sets on the shared display (step 3105). Thereafter, it starts the display control unit 0310 described later (step 3103) so that only the shared image is displayed in the image and handwritten data display area 0404 by means of the display control unit 0310 and then ends the processing of the display switching unit 0309.

On the other hand, unless the display switching unit 0309 determines that the small screen display is ON in the step 3104, it sets off the small screen display, sets off the shared display, and sets on the shared candidate image display (step 3106). Thereafter, it starts the display control unit 0310 described later (step 3103) so that only the shared candidate image not reduced and acquired by the image acquisition control unit 0308 is displayed in the image and handwritten data display area 0404 by means of the display control unit 0310 and then ends the processing of the display switching unit 0309.

Figure 32:
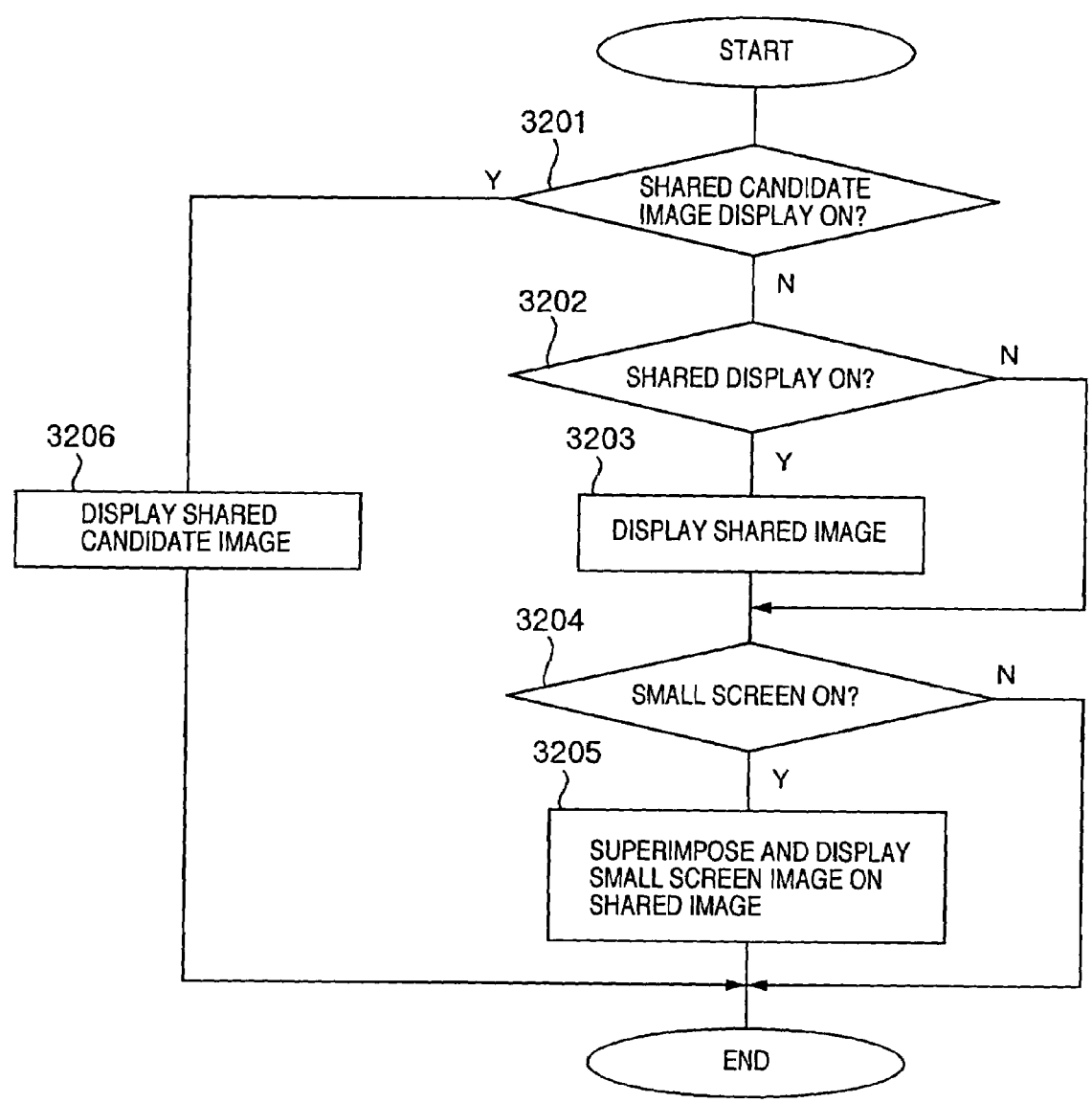
FIG. 32 is an example of a flowchart showing contents of processing of a display control unit in the communications terminal according to the third embodiment.

The following describes details of processing of the display control unit 0310 according to the third embodiment with reference to FIG. 32. Referring to FIG. 32, there is shown an example of a flowchart illustrating contents of the processing of the display control unit 0310 according to the third embodiment.

As shown in FIG. 32, the display control unit 0310 first determines whether the shared candidate image display is ON (step 3201). If it determines that the shared candidate image display is ON, it displays the shared candidate image acquired by the image acquisition unit 0211 into the image and handwritten data display area 0404 on the display unit 0206 (step 3206). Thereafter, it ends the processing of the display control unit 0310. The display of the shared candidate image is achieved by displaying the image currently expanded in a shared candidate image area on a memory/storage device 0202 and a secondary memory/storage device 0209 into the image and handwritten data display area 0404.

On the other hand, unless the display control unit 0310 determines that the shared candidate image display is ON in the step 3201, it further determines whether the shared display is ON (step 3202). If it determines that the shared display is ON, it displays a shared image currently shared with the other terminal in communication into the image and handwritten data display area 0404 on th display unit 0206 (step 3203). The display of the shared image is achieved by displaying the image currently expanded in a shared image area on the memory/storage device 0202 or the secondary memory/storage device 0209 into the image and handwritten data display area 0404.

On the other hand, unless the display control unit 0310 determines that the shared display is ON in the step 3202, it progresses to step 3204 without displaying the shared image.

Subsequently, the display control unit 0310 determines whether the small screen display is ON (step 3204). If it determines that the small screen display is ON, it displays a reduced image of the shared candidate image generated by the image acquisition control unit 0308 into the image and handwritten data display area 0404 on the display unit 0206 (step 3205). Thereafter, the processing of the display control unit 0310 is ended. If the shared image is displayed in the step 3203, the reduced image of the shared candidate image is superimposed and displayed on the shared image. The display of the reduced image of the shared candidate image is achieved by displaying the image currently expanded in a reduced image area on the memory/storage device 0202 or the secondary memory/storage device 0209 into the image and handwritten data display area 0404.

On the other hand, unless the display control unit 0310 determines that the small screen display is ON in the step 3204, it ends the processing of the display control unit 0310 without displaying the reduced image of the shared candidate image.

Figure 33:
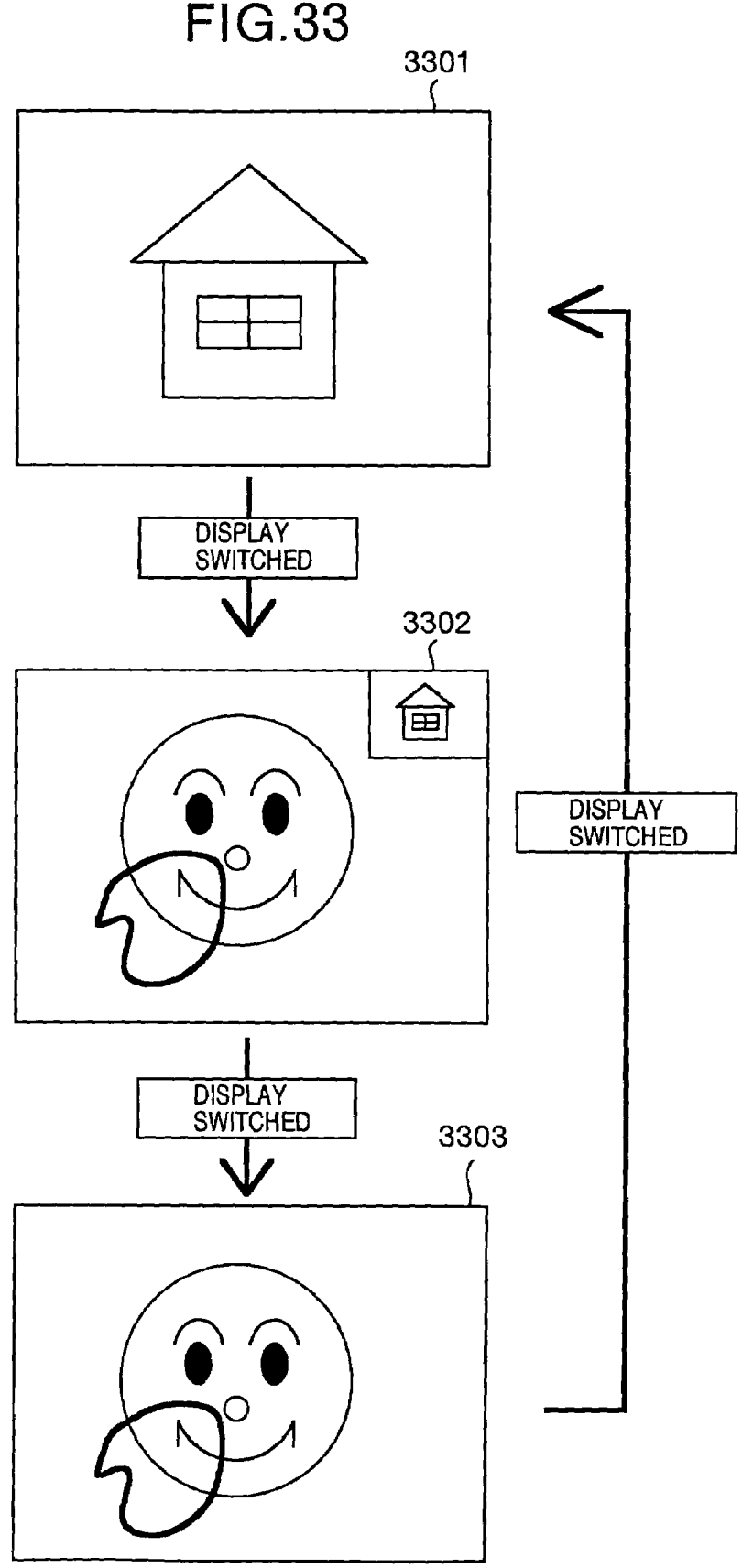
FIG. 33 is a diagram showing a sample display switching of switching a display in the communications terminal according to the third embodiment.

According to the third embodiment as set forth hereinabove, if the user pushes the display switching button 0413 to give an instruction of switching the display image as shown in FIG. 33, the user can switch the display sequentially among the display of only the shared image, the display of only the shared candidate image, and the display of the reduced image of the shared candidate image superimposed on the shared image. Referring to FIG. 33, there are shown an illustration 3301 of displaying only the shared candidate image acquired by the image acquisition unit 0211, an illustration 3302 of displaying the reduced image of the shared candidate image generated by the image acquisition control unit 0308 superimposed on the image and handwritten data shared with the other terminal, and an illustration 3303 of displaying only the image and handwritten data shared with the other terminal. While the image and handwritten data shared with the other terminal are automatically displayed if the shared candidate image is displayed when the handwritten data is received from the other terminal in communication in the third embodiment, the present invention is not so limited, but it is susceptible of application to an arrangement where the switching is suspended until the user explicitly switches the display between the shared candidate image and the image and handwritten data shared with the other terminal. In this case, the processing in the step 1204 described with reference to FIG. 12 may be removed so that the display is not switched to the shared image even if the handwritten data is received. In addition, a shared image and a reduced image of a shared candidate image can be displayed by setting on the small screen display, setting on the shared image display, and setting off the shared candidate image display in the step 1204. With this operation, the shared image is displayed whenever the other terminal writes handwritten data into the image, together with the reduced image of the shared candidate image that is currently an object of interest. Thereby, the terminals can communicate with each other smoothly. In the first, second, and third embodiments, software is executed by the central processing unit 0201 to operate the control unit 0301, the voice transmission unit 0302, the voice reception unit 0303, the image transmission control unit 0304, the image reception control unit 0305, the handwritten data transmission control unit 0306, the handwritten data reception control unit 0307, the image acquisition control unit 0308, the display switching unit 0309, and the display control unit 0310. Hardware, however, can be used for operating a part or all of these units.

Furthermore, while the present invention has been described by giving an example of using a voice call in the first, second, and third embodiments, the voice call is not indispensable. Unless the terminal includes the voice call function, the parts related to the following may be omitted in each embodiment: the voice input unit 0203, the voice output unit 0204, the voice transmission unit 0302, the voice reception unit 0303, the call start button 0407, and the call end button 0408.

Still further, while the present invention has been described by giving an example of the image transmission control unit 0304 and the image reception control unit 0305 not storing an old shared image in the memory/storage device 0202 nor the secondary memory/storage device 0209 in the first, second, and third embodiments, for example, the image transmission control unit 0304 or the image reception control unit 0305 may store an old shared image in the secondary memory/storage device 0209 before setting a new shared image so that the old shared image can be referenced or shared with the other terminal in accordance with a user's instruction.

Furthermore, while the present invention has been described by giving an example of a single shared image in the first, second, and third embodiments, it is not so limited, but there can be a plurality of shared images. In this case, data of each shared image may be expanded in each individual shared image area on the memory/storage device 0202 or the secondary memory/storage device 0209 and these shared images may be switched for the display in accordance with a user's instruction.

According to the embodiments, it becomes possible to provide a user-friendly communications terminal having a small display screen such as, for example, a portable terminal capable of sharing image(s) with the other terminal, exchanging handwritten data with the terminal, and displaying the exchanged handwritten data on the shared image(s) in real time. Particularly when one terminal has image(s) shared with the other terminal and it is displaying a candidate for the next shared image(s) such as image(s) taken by an image acquisition unit such as a camera during communication, the terminal can display the candidate image(s) without losing the image(s) shared with the other terminal nor handwritten data. In addition, the terminal can display the shared candidate image(s) while displaying the image(s) and handwritten data shared with the other terminal, thereby enabling smooth communication. Furthermore, a user can check the shared candidate image(s) before sharing it with the other terminal in communication, thereby preventing an unfavorite image(s) from being transmitted to the other terminal and therefore removing difficulties in use.

According to the present invention, it becomes possible to provide a terminal capable of sharing an image with the other terminal, exchanging handwritten data with the terminal, and displaying the exchanged handwritten data on the shared image in real time.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A communications terminal, having image acquisition means for acquiring image data, data transmitter-receiver means for transmitting and receiving data to and from an other terminal when communicating with the communications terminal, display means for displaying an image or data transmitted or received by the image acquisition means or the data transmitter-receiver means, comprising:
   a shared image storing unit which stores shared image data being shared between the communications terminal and the other terminal;
   image transmission control means for transmitting shared image data shared with the other terminal;
   image acquisition control means for acquiring shared candidate image data as a candidate for an image shared with the other terminal;
   a shared candidate image storing unit which stores the shared candidate image data; and
   display control means for switching the display between a display of said shared image data stored in the shared image storing unit and a display of said shared candidate image data stored in the shared candidate image storing unit when acquiring said shared candidate image data while said shared image data is displayed on said display means.

2. The communications terminal according to claim 1, further comprising:
   image reception control means for receiving shared image data transmitted from the said other terminal,
   wherein said display control means displays the transmitted image as an image shared with the other said terminal.

3. The communications terminal according to claim 2, wherein:
   said image reception control means sets the received image data as new shared image data.

4. The communications terminal according to claim 2, further comprising:
   memory means for storing image data,
   wherein, before setting said received image as data of a new shared image, said image reception control means stores data of an image having been a shared image previous to the new shared image into said memory means.

5. The communications terminal according to claim 1, wherein:

said display control means switches the display to a display of said shared image after displaying the shared candidate image on said display means for a certain period of time if said image acquisition means acquires the shared candidate image data.

6. The communications terminal according to claim 1, further comprising:
display image switching instructing means for instructing the image transmission control means on switching between the display of the shared image and the display of the shared candidate image,
wherein said display control means performs switching between the display of the shared image and the display of the shared candidate image according to the instruction of the display image switching instructing means.

7. The communications terminal according to claim 1, further comprising:
image transmission instructing means for instructing said image transmission control means to transmit the data of said shared image to the other terminal,
wherein said image transmission control means sets the data of said shared candidate image as data of a new shared image on the basis of the instruction of said image transmission instructing means and transmits the data of the new shared image to the other terminal.

8. The communications terminal according to claim 1, further comprising:
handwriting input means for a user to input handwritten data;
a superimposing display control unit which superimposes a plurality of shared image data stored in the shared image storing unit to generate display data;
handwritten data transmission control means for controlling a transmission of the handwritten data input by the handwriting input means as shared image data and superimposing the transmitted handwritten data on said shared image by the superimposing display control unit; and
handwritten data reception control means for controlling a reception of handwritten data transmitted from the other terminal as shared image data and superimposing the received handwritten data on said shared image by the superimposing display control unit,
wherein said communications terminal can share the image and handwritten data with the other terminal.

9. The communications terminal according to claim 8, wherein:
said display control means switches the display to the display of said shared image on the basis of a fact that said handwritten data reception means has received the handwritten data.

10. The communications terminal according to claim 1, wherein:
said image acquisition control means generates a reduced image from the data of said shared candidate image and said display control means displays the reduced image on said shared image.

11. The communications terminal according to claim 10, wherein:
said display control means displays said shared candidate image for a certain period of time and then displays said reduced image on said shared image when said image acquisition means acquires the data of said shared candidate image.

12. The communications terminal according to claim 10, further comprising:
display image switching instructing means for giving an instruction on switching among the display of said shared image, the display of said shared candidate image, and the display of said reduced image,
wherein said display control means switches the display among the display of said shared image, the display of said shared candidate image, and the display of said reduced image on said shared image.

13. The communications terminal, according to claim 10, further comprising:
image transmission instructing means for instructing said image transmission control means to transmit the data of said shared image to the other terminal,
wherein said image transmission control means sets the data of said shared candidate image as data of a new shared image on the basis of the instruction of said image transmission instructing means and transmits the data of the new shared image to the other terminal.

14. The communications terminal according to claim 13, wherein:
said image reception control means sets the received image data as data of a new shared image.

15. The communications terminal according to claim 10, further comprising:
handwriting input means for a user to input handwritten data;
a superimposing display control unit which superimposes a plurality of shared image data stored in the shared image storing unit to generate display data;
handwritten data transmission control means for controlling a transmission of the handwritten data input by the handwriting input means as shared image data and superimposing the transmitted handwritten data on said shared image by the superimposing display control unit; and
handwritten data reception control means for controlling a reception of the handwritten data transmitted from the other terminal as shared image data and superimposing the received handwritten data on said shared image by the superimposing display control unit,
wherein said communications terminal can share the image and handwritten data with the other terminal.

16. The communications terminal according to claim 15, wherein:
said display control means performs switching among the display of said shared image, the display of said shared candidate image, and the display of said reduced image on said shared image on the basis of a fact that said handwritten data reception means has received the handwritten data.

17. The communications terminal according to claim 15, wherein:
said display control means displays said reduced image on said shared image in such a way that said reduced image is displayed in an area other than the area in which said handwritten data is displayed in said shared image.

18. The communications terminal according to claim 1, further comprising:
memory means for storing image data,
wherein, before setting said shared candidate image as data of a new shared image, said image transmission control means stores data of an image having been a shared image previous to the new shared image into said memory means.

19. A method for acquiring image data at a communications terminal for transmitting and receiving data to and from an other terminal when communicating with the communications terminal and for displaying an image or data transmitted or received by the communications terminal, comprising the steps of:
- storing shared image data being shared between the communications terminal and the other terminal;
- transmitting shared image data shared with said other terminal;
- acquiring shared candidate image data as a candidate for an image shared with said other terminal;
- storing the shared candidate image data;
- switching to a display of said stored shared image data; and
- displaying said shared candidate image data when acquiring said shared candidate image data while said shared image data is displayed.

20. The method according to claim 19, further comprising:
- inputting handwritten data;
- superimposing a plurality of shared image data to generate display data;
- controlling a transmission of the handwritten data as shared image data and superimposing the transmitted handwritten data on the shared image data;
- controlling a reception of handwritten data transmitted from the other terminal as shared image data and superimposing the received handwritten data on said shared image;
- wherein the communications terminal can share the image and the handwritten data with the other terminal.

* * * * *